United States Patent [19]

Sun

[11] Patent Number: 5,056,118
[45] Date of Patent: Oct. 8, 1991

[54] METHOD AND APPARATUS FOR CLOCK AND DATA RECOVERY WITH HIGH JITTER TOLERANCE

[75] Inventor: Yinshang Sun, Laguna Niguel, Calif.

[73] Assignee: Rockwell International Corporation, El Segundo, Calif.

[21] Appl. No.: 353,137

[22] Filed: May 16, 1989

[51] Int. Cl.$^5$ .............................................. H04L 7/033
[52] U.S. Cl. ................................... 375/106; 375/120; 341/69; 331/17
[58] Field of Search ....................... 375/81, 94, 95, 87, 375/85, 86, 79, 104, 106, 119, 120; 328/151; 331/1 R, 17, 25; 341/69, 73, 68; 307/518, 523, 353, 230

[56] References Cited

U.S. PATENT DOCUMENTS

| | | | |
|---|---|---|---|
| 3,657,653 | 4/1972 | Wilkinson | 375/94 |
| 4,617,679 | 10/1986 | Brooks | 375/119 |
| 4,773,085 | 9/1988 | Cordell | 375/120 |
| 4,803,705 | 2/1989 | Gillingham et al. | 331/17 |

OTHER PUBLICATIONS

Charge-Pump Phase-Lock Loops, Floyd M. Gardner *IEEE Transactions on Communications*, vol. COM-28, No. 11, Nov. 1980, pp. 1849-1858.
Phase-Frequency Detector MC4344-MC4044, MTTL *Complex Functions*, Motorola Semiconductor Products, Inc., Printed Nov. 1983.

Primary Examiner—Douglas W. Olms
Assistant Examiner—Marianne Huseman
Attorney, Agent, or Firm—H. Fredrick Hamann; George A. Montanye; Gregory D. Ogrod

[57] ABSTRACT

Apparatus and method are disclosed for implementing a clock and data recovery circuit for use on digital networks. A fully integrated phase-locked loop extracts a clock signal embedded in a data stream. Two trimming digital-to-analog converters simultaneously bring the center frequency of a current controlled oscillator and the phase-locked loop closed loop bandwidth to desired values. A triple sampler captures jittering data and aligns them with the recovered clock. The input jitter tolerance for the method and apparatus is two to three times that of previously reported phase-locked loop based circuits.

53 Claims, 20 Drawing Sheets

FIG. 8 CHARGE-PUMP PHASE-LOCKED LOOP

METHOD AND APPARATUS FOR CLOCK AND DATA RECOVERY WITH HIGH JITTER TOLERANCE

BACKGROUND OF THE INVENTION

1. Field of the Invention

The present invention relates to communications and data transfer systems and more particularly to a method and apparatus for recovering data and an associated clock signal from a high speed data stream with high jitter tolerance. The invention further relates to a method for using a data activated sequential-logic phase detector and a digitally trimmed current controlled oscillator in a phase-locked loop to recover a clock from a data stream and sampling a data stream at three different phase positions of a recovered clock signal to produce a received data signal.

2. Related Technical Art

There is an increasing demand in the communications industry to provide high quality voice or analog services, and high speed, high volume, data communications. Especially in the areas of image transfer, on-line computer databases, accounting services, or central record systems, the demand for high volume digital data communications is rapidly increasing. In order to meet present demands and future communication needs, new digital networks are being proposed and developed which are capable of utilizing advanced digital switching, control, and communication technology to accommodate larger bandwidth signals and faster data transfer rates.

Digital networks propose to free communication system users from the restrictions of lower speed, 1200 to 9600 bits per second (bps), data transfers previously imposed by analog type communication circuits. New digital networks or network standards call for supporting data transfer speeds on the order of 64K or 64,000 bps with very low noise. As fiber optic links undergo further advancement and are placed into more extensive service, bandwidths and capacity for digital data transfer should increase by an order of magnitude to provide previously unrealized transfer rates on the order of 100M-600M bps.

Such significant increases in data transfer rates make real-time accounting, interactive communications and higher quality voice communications possible on a large national and international scale. Digital networks promise to eliminate the use of modems in many applications, provide low cost increases in data transfer capabilities, and allow different types of transmissions (voice, data, image, high or low speed) to be accommodated on a single transfer medium or link. Digital networks also provide relief from the error rate limitations imposed by older analog links which were inherently noisier and, therefore, more prone to create transmission errors.

While extension to a 64K bps standard technology represents a significant improvement, it is insufficient for accommodating all desired communication traffic being transferred into or through a network. That is, this higher transfer rate accommodates higher speeds and quality for single system users but is not capable of handling large numbers of similarly situated users. This has led to the development of multiplexed and encoded signals to provide multiples of the 64K bps signals. In the United States, data transfer circuits employing multiplexed 64K bps circuits are referred to as T-1 carriers and have total capacities of 1.56M bps or 24 channels of 64K bps capacity each. There are also higher capacity carriers, designated as T-3 carriers, which operate in the 44.736M bps data transfer range as an alternative for very large capacity data links. European standards currently include a 30 channel 2.049M bps link. In addition, to provide more cost efficient use of network capacity, individual communication signals for several smaller users (high speed or high quality) are often multiplexed, using Time Division Multiplexed (TDM) or Pulse Code Modulation (PCM) signal techniques, into a single channel on T-1 or T-3 carriers, or in digital networks.

However, as digital communications systems develop, such as the Integrated Service Digital Network (ISDN), they adopt stringent specifications and standards that must be accommodated by user interfacing equipment. That is, as the designs for advanced digital networks come into focus or closer to actual implementation, certain key operational requirements are imposed on system users. One such requirement is the amount of jitter tolerance allowed for interface equipment or devices. The key performance characteristic of any clock/data recovery circuit is its input jitter tolerance. The input jitter tolerance is the maximum amount of phase jittering on an input data stream tolerable by the circuit and still recover the clock and data. Current plans call for high jitter (tolerance rates at the 1.544 to 2.048M bps transfer speeds. These requirements challenge the current designs for Line Interface Units (LIU) which are the key communication elements needed for transfer of information between users and a network. Therefore, the network requirements also challenge the requirements for individual LIU components such as data detectors, filters, and phase-locked loops.

Carrier or network controllers track data transmissions and communicated digital information at the high network transfer rate or frequency until demultiplexed into individual communication signals. It is advantageous that networks are capable of accommodating a variety of communication signals having differing internal transfer rates and can allocate network bandwidth or resources, unequally, as required. However, a mechanism is required to track and lock onto the transfer rate of each individual communication signal when demultiplexed to assure proper decoding and information reception.

Each communication signal must have an internal or inherent clock associated with it for synchronizing digital data within the signal, and for proper data alignment and decoding. This internal or individual clock must be tracked and extracted or recovered at the time of reception by the LIU in order to detect and decode the data from the network or carrier. Therefore, the line interface unit must incorporate circuitry to recover both data and its associated clock from the network in order to function properly. However, synchronization with a local clock or oscillator often results in many problems. Clock and data recovery in the presence of noise and jitter, as well as at the required high transfer rates, has proven difficult.

Current approaches to tracking and recovering data fall into three general categories. These are: LC-tuned tank types, digital phase-locked loops, and analog phase-locked loops. LC tank-type circuits require the use of external components to determine or affect frequency tuning and are generally sensitive to patterns in the actual data being transferred. That is, patterns of high and low levels, and any harmonic components, occurring in the data as it is being received and passed through the LC circuits impact the LC tuning and make accurate data recovery difficult.

Digital phase-locked loop type circuits suffer high transfer rate phase problems such as effecting large frequency changes when encountering missing data pulses. Analog phase-locked loop type circuits provide fully integrated circuits with smooth clock outputs but require individual component optimization making products for generalized application difficult to achieve. Analog phase-locked loops also exhibit problems in accommodating significant quantities of input jitter.

One technique used to counter some of the problems encountered with jitter is use of an "elastic store". Data is received and temporarily stored while the clock is being recovered. The data is generally detected using a 90 degree phase shifted recovered clock in order to compensate for high frequency jitter which phase shifts the data. The recovered data can also be further retimed when transmitted or transferred from the store to remove the effects of low frequency line jitter. Typical circuits used to implement these functions accommodate jitter of $+/-0.25$ Unit Intervals (UI) or $+/-90$ degrees of phase error. However, this is not enough compensation for network requirements.

What is needed is a new method and apparatus for receiving a high speed data stream and recovering a clock and data embedded therein. The apparatus must be able to lock onto the frequency or clock rate of the data and continue to accurately track and recover the data in the presence of noise and jitter in the communication path or channel. It would also be beneficial to provide apparatus that is easily reduced to monolithic structures capable of mass production and low cost implementation.

SUMMARY

In view of the limitations of the art, one purpose of the present invention is to provide a highly jitter tolerant interface circuit for data and clock recovery in a digital network.

An advantage of the present invention is that it offers multiple operation frequencies with tuning resolution commensurate with advanced network requirements.

Another purpose of the present invention is to provide an apparatus for more reliably recovering and tracking a clock embedded in a data stream.

Another advantage of the present invention is that it provides improved clock recovery with low complexity.

An additional advantage of the invention is the ability to recognize and compensate for harmonic locking.

One object of the invention is to provide a means of tuning a source frequency for data clock recovery with improved frequency resolution and reliability using monolithic integrated circuit components.

It is a further advantage of the present invention that the monolithic design for the voltage controlled oscillator is self compensating for manufacturing variations in components.

These and other purposes, objects, and advantages are realized in a method of recovering data from a digital data stream, comprising the steps of generating a recovered clock signal at substantially the same frequency and phase as the digital data, sampling the stream of data at a plurality of predetermined, preferably three, phase positions relative to the recovered clock phase, and then generating an output data signal comprising the digital sum of the detected data. In a preferred embodiment, the sampling comprises detecting the presence of "1" data values in the data stream which are displaced in phase from the recovered clock phase by first, second, and third predetermined amounts. The preferred phase relationship for these amounts is either 0, 90, and 180, or $-90$, 0, and 90 degrees respectively. However, other phase relationships can be used dependent upon the application and the amount of jitter to be attenuated in a given signal processing stage. The results of sampling at the various phase positions are then digitally summed and sampled at a data rate determined by the recovered clock.

A recovered clock is provided for the sampling steps by using an adjustable frequency source with a preset bandwidth to generate a preselected frequency. A preferred clock source is a current controlled oscillator having a digitally controlled central frequency. The difference in frequency and phase between the preselected frequency and data in the data stream is determined and the frequency of the internal source adjusted so as to substantially equal that of the data. The frequency and phase difference is determined using a data activating sequential-logic phase detector which detects the presence of a leading edge for data values of "1" during recovered clock cycles. If no data is detected during a clock cycle, a reset input is provided to the phase detector. However, no reset signal is provided when data is detected as present.

The phase/frequency detector generates control signals in the form of an UP signal when the recovered clock lags the data in phase or frequency and a DOWN signal when the recovered clock leads the data in phase or frequency. The UP and DOWN signals are applied to a charge-pump loop filter which is used to convert these logic signals into an analog control signal which is applied to a current controlled oscillator.

The charge-pump and the oscillator both utilize digitally controllable current sources. Therefore, the bandwidth of the charge-pump and the central frequency of the oscillator are adjusted digitally using a common digital command word. The digital command is applied to a trimming network for the charge-pump which converts the command into a control current. The digital command is also converted into a control current for the oscillator. A central operating frequency for the current controlled oscillator is preset using the digital code by applying the digital code to a decoder to provide a control current for the current controlled oscillator. At the same time, the loop filter bandwidth is preset using the same digital code to set a loop current trimming value in a current trimming network.

An apparatus for recovering data from an input data stream according to the method of the invention, comprises a means for generating a recovered clock signal at a frequency and phase substantially the same as the digital data, connected to a sampling means for detecting the presence of data at a plurality of predetermined phase positions relative to the recovered clock signal.

In a preferred embodiment, the sampling means comprises first, second, and third sampling elements each detecting the presence of a "1" data value at first, second, and third predetermined phase positions and having their outputs connected to a gate element which provides an output whenever any of the elements detect a data value of "1". The sampling elements typically comprise Flip-Flops which are connected to receive a recovered clock at a clock input, and the data stream at a data input. A first delay means is connected in series with one Flip-Flop clock input, and a second delay means is connected in series with a second Flip-Flop clock input for delaying the recovered clock input, in phase, to these two inputs by preselected amounts. Generally one of the delay means comprises an inverter and the other delay means comprises a phase delay circuit for delaying an arrival time of the recovered clock input on the order of 90 degrees. The gate element comprises a three-input OR-type gate, or a three-input NOR gate with an inverter in series therewith. A fourth sampling means such as another Flip-Flop is connected in series with the gate and connected to receive the recovered clock as a reset.

The recovered clock generation is accomplished in an apparatus utilizing a phase-locked loop comprising a data activated type IV sequential-logic phase/frequency detector with outputs connected to a charge-pump loop filter further connected in series with a current controlled oscillator. The oscillator provides an output recovered clock signal which is also fed back into a phase/frequency detector recovered clock input. The phase/frequency detector has a data input, a recovered clock input, UP and DOWN outputs, and a control means for deactivating the detector unless data is received during a clock pulse.

An exemplary data activating sequential-logic phase/frequency detector comprises a first input/output latch with two reset inputs, a second input/output latch with at least three reset inputs, at least a third input latch having an output connected to the one of the three resets on the second input/output latch, and a first gate element connected to a set port of the third input latch. The first gate element has input ports for receiving the data and a recovered clock signal and operates to reset the second input/output latch for at least one predetermined clock period when both of its input ports are not detecting a "1" level simultaneously.

In a preferred embodiment, the first input/output latch comprises a first two-input NAND gate with an output connected to one input of a three-input NAND gate which has an output connected to one input of the first two input gate NAND. The second input/output latch comprises a second two-input NAND gate with an output connected to one input of a first four-input NAND gate which has an output connected to one input of the second two input gate. The third input latch comprises a third two-input NAND gate with an output connected to one input of a fourth two-input NAND gate which has an output connected to one input of the third two input NAND gate.

A third NAND gate latch has a set input connected to the output of the first two input NAND gate, a reset input, and an output connected to an input of the three-input NAND gate. A fourth NAND gate latch has a set input connected to the output of the second two input NAND gate, a reset input, and an output connected to an input of the first four-input NAND gate. A second four-input NAND gate is connected to receive outputs from the first and second two input NAND gates, and the third and fourth NAND latches, and is connected on an output to a reset of the third and fourth NAND latches and to inputs of the three-input and first four-input NAND gates. A delay means is connected in series between the first gate element and third input latch for delaying the arrival of a reset output by a preselected period.

In further embodiments, the data activating sequential-logic phase/frequency detector comprises training means connected to the gate means for deactivating the detector data input until a preselected capture range is reached. An exemplary training means comprises a fifth two-input type NAND gate connected at one input to an output of the third input latch and having an output connected to one of the three resets on the second input/output latch and also having a second input connected to receive a deactivation control signal.

To prevent non-allowed output states, the phase/frequency detector can be provided with a two-input OR gate connected on one input to the detector UP output, a second two-input OR gate connected on one input to the DOWN output, a first inverter with an input connected to the DOWN output and an output to a second input of the first OR gate, and a second inverter with an input connected to the UP output and an output to a second input of the second OR gate.

The charge-pump loop filter comprises at least one filter capacitor C with a trimming means connected to it for establishing a base operating current. Charging and discharging means are also connected to the capacitor for increasing a stored charge on the capacitor in response to an UP signal, and for decreasing a stored charge in response to a DOWN signal. The trimming means comprises a first digital trimming decoder for translating a digital code into an analog current level while a second digital decoder is used for translating a digital code into an analog current for controlling the current controlled oscillator. A transfer means or bus is connected to both of these decoders for transferring the same digital code to both substantially simultaneously.

A preferred current trimming decoder for the charge-pump loop filter comprises a plurality of field effect transistors connected in parallel between a current source and a common output terminal having gates connected to receive separate portions of a digital code wherein different ones of the field effect transistors are activated to deliver current.

BRIEF DESCRIPTION OF THE DRAWINGS

The novel features of the present invention may be better understood from the following description when taken in conjunction with the accompanying drawings in which like characters refer to like parts and in which.

DETAILED DESCRIPTION OF PREFERRED EMBODIMENTS

The present invention provides a method and apparatus, using a phase-locked loop based monolithic LIU circuit, for sampling a data stream provided from a high speed digital network, extracting a clock embedded in the data during reception, and detecting the data in the presence of jitter. The data is sampled with respect to the recovered clock at different relative phase conditions or positions by using a series of Flip-Flops which are strobed by the recovered clock, and a delayed clock, so that sampling occurs at about 0, 90, or 180 degree positions of the recovered clock phase. The sampling output is further sampled by a Flip-Flop which provides a Non Return-to-Zero (NRZ) data output. The recovered clock is provided by locking onto the phase and frequency of the incoming data using a Phase-Locked Loop (PLL) which comprises a sequential-logic phase detector with control logic configured to prevent activation unless data is present during clock cycles, and for training with respect to a second reference frequency when the data is not active, or when dictated by a higher logic block. The frequency of the PLL output is determined by a Current Controlled Oscillator (ICO) employing a monolithic structure with a unique current trimming network and digital decoder.

Figure 1:
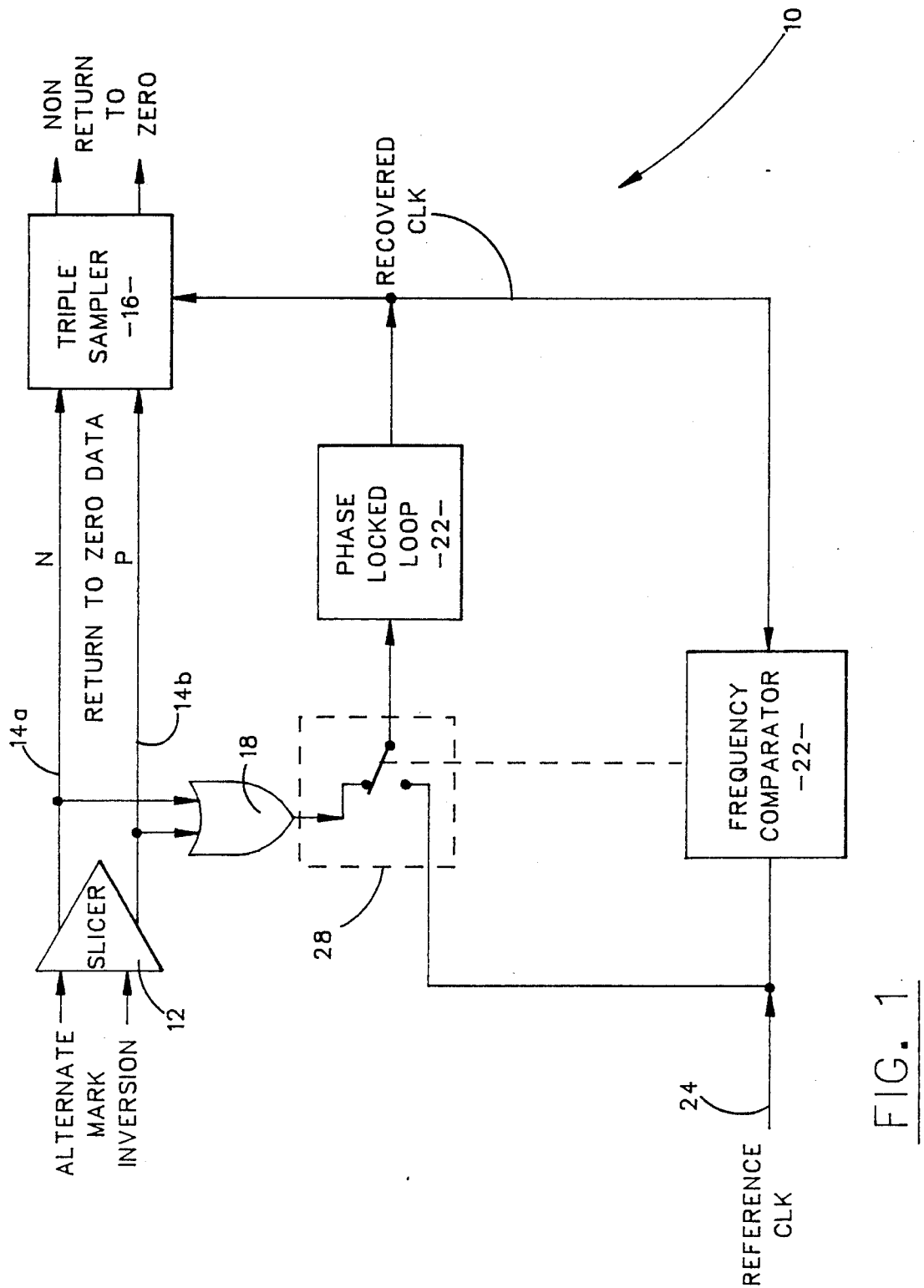
FIG. 1 illustrates a functional overview of a data and clock recovery apparatus operating according to the principles of the present invention.

An overview of the method and apparatus of recovering and converting RZ or Alternate Mark Inversion (AMI) data to NRZ data is illustrated in FIG. 1. Since networks commonly transfer data in AMI format, for purposes of illustration, the circuit of FIG. 1 has provision for inputting AMI-type data. However, direct input of RZ-type data may be used in many applications without varying from the teachings of the invention but by omitting the AMI data slicer.

In FIG. 1, the data recovery apparatus 10 employs a data stream slicer 12 shown connected to receive AMI data. The slicer 12 accepts the three state or ternary level AMI data signal and converts it into binary level or Return-to-Zero (RZ) type signals commonly referred to as the P and N RZ signals. The N and P output signals from the AMI slicer 12 are provided on two data lines 14a and 14b, respectively, each line having a data signal representing a portion of the AMI data. The two RZ signals are transferred into a triple sampler 16 for data detection or recovery, and conversion into NRZ data.

At the same time, each of the two RZ data signals are input to an OR type gate 18 which has an output connected to a Phase-Locked Loop (PLL) 20 used to track the data stream and recover or extract the embedded clock frequency of the recovered data. That is, the PLL 20 recovers the data clock and adjusts the sampling clock frequency employed in the triple sampler 16. While the benefits of the triple sampler 16 can be realized using a variety of phase-locked loop devices known in the art, it has been found most advantageous to implement the PLL 20 using a sequential-logic phase/frequency detector type circuit with control logic which allows for improved jitter tolerance and locking characteristics.

One inherent danger in analog PLL based clock and data recovery circuits is that the PLL can lock onto a sub-harmonic of the data carrier frequency, especially when the data pattern is repetitive. The spectrum of repetitive data generally has local peaks at a sub-harmonic frequency near the peak of the data carrier frequency. A commonly used scheme is to limit the PLL (VCO) frequency range to within 6 to 7 percent of the desired (carrier) center frequency to avoid locking onto frequencies outside the desired central (data) range. But this only provides limited protection from sub-harmonic locking and is useless when the sub-harmonic appears within the allocated PLL (VCO) frequency range.

This problem is solved in the present invention by providing a frequency comparator 22 to monitor the lock-in status of the PLL 20 and to detect and correct potential sub-harmonic locking. The frequency comparator 22 receives the recovered clock from the PLL 20 and compares its frequency to a precision reference clock (not shown) on the input line 24. This other reference can be provided from a variety of preset timing circuits but is generally provided by another measurement of the data stream carrier frequency. If the frequency of the recovered clock varies more than a predetermined amount from the reference clock 24, then a decision is made to use the reference as an alternate data source for the PLL 20 to lock onto. That is, the PLL 20 is not adequately locking onto the embedded clock in the data and an external reference is used to "train" the PLL 20 until a satisfactory locking condition is reached, at which time it is switched back to the RZ data stream. Since the trained PLL clock is now very close to the carrier frequency of the data, it will easily lock onto it. Thus, instead of resisting sub-harmonic locking, the circuit detects it and corrects it.

The input for the PLL 20 is transferred by a switching or relay element 28 to receive input from the reference clock source (not shown) rather than the RZ data from the OR gate 18. The switching element 28 can comprise a variety of elements known in the art such as solid state relays or electronic switches. During the application of the reference source to the PLL 20, the PLL 20 is "training" itself to acquire the data signal. This in effect acts as a course tuning of the PLL 20 prior to relying on more refined data tracking and clock recovery abilities of the PLL 20. This is used where the PLL 20 is operating outside the capture range frequency for the data. Once the recovered clock frequency is detected to be within a desired capture range for the PLL 20, the switch element 28 redirects the PLL 20 input to the OR gate 18, and the PLL 20 uses the RZ data stream to recover a clock.

Assuming the PLL 20 is tracking the RZ data stream properly, the triple sampler uses the recovered clock signal output by the PLL 20 to clock the sampling elements used to detect RZ data and convert it into NRZ data. The triple sampling technique is illustrated in more detail in FIGS. 2-7.

Figure 2:
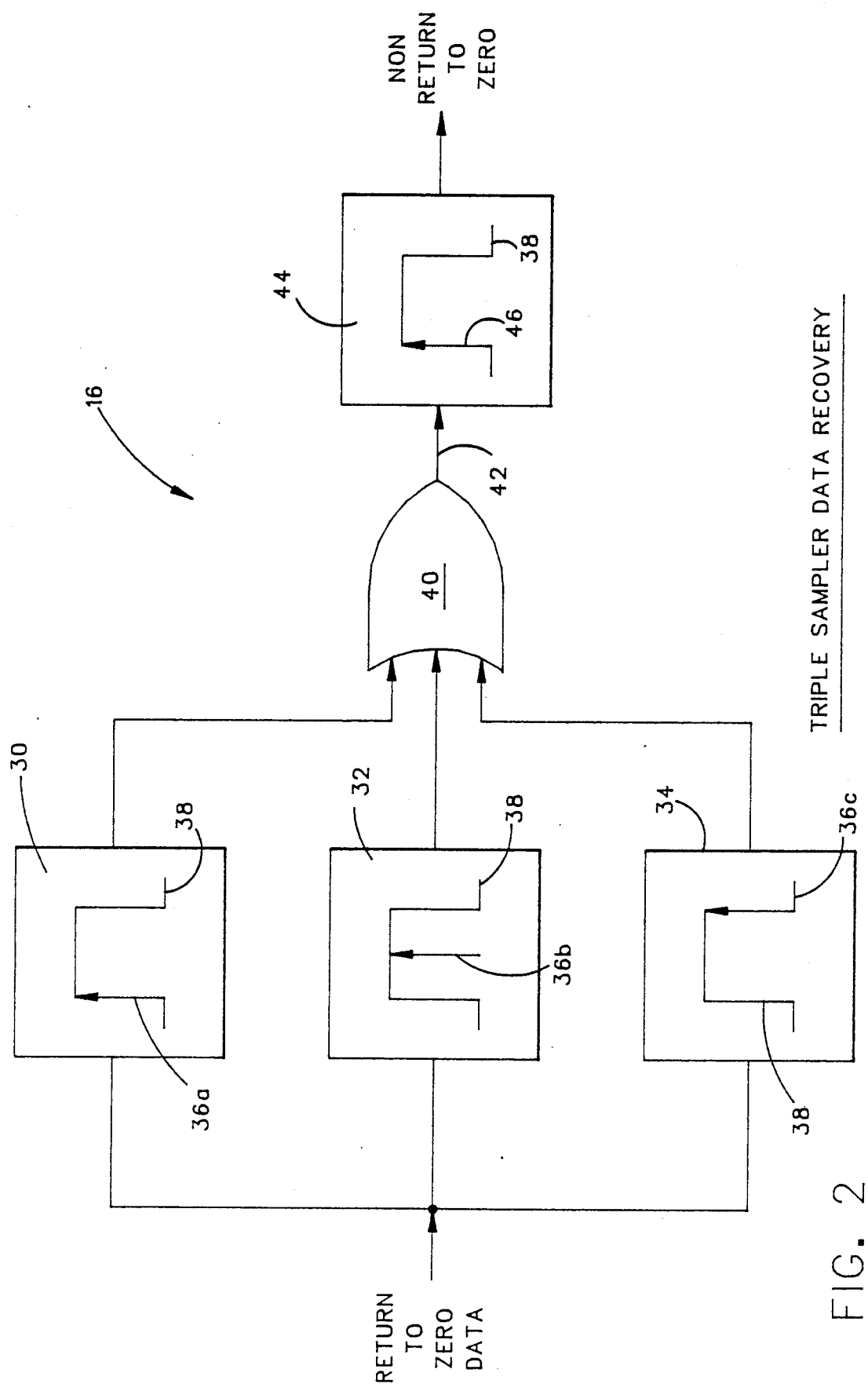
FIG. 2 illustrates an overview of a triple sampling method for recovering data according to the principles of the present invention.

An overview of the apparatus and method implemented by the triple sampler 16 is illustrated in the diagram of FIG. 2. In FIG. 2, an incoming RZ data stream or signal, one of the P or N RZ data lines, is applied to an input for each of three sampling elements 30, 32, and 34. The signal can be amplified or otherwise processed and attenuated where desired prior to sampling, however, for clarity of illustration a simple split into three input signals is shown. Each of the input signals, to elements 30, 32, and 34, are sampled at differing phase points with respect to the recovered clock signal provided by the PLL 20. This is shown in FIG. 2, by the three different positions of an arrow 36 (36a, 36b, 36c) representing sampling points on the recovered clock waveform 38 for each of the sampling elements 30, 32, and 34.

As the incoming RZ data is sampled at the three differing phase positions of the recovered clock 38, the sample elements provide outputs indicative of the detection of a "1" or "high" value. The sampled outputs are transferred to an OR type logic element 40 which results in a digital "1" or high value on an output line 42 whenever any of the three sampling elements 30, 32, or 34 detects a high data state on its input. Therefore, any time the received or incoming RZ data is detected as providing a transition to a high data level within the three phase periods, a high data level is transferred onto the line 42.

The data signal provided on the line 42 is transferred to a fourth sampling element 44 which is strobed periodically by the recovered clock 38 from the PLL 20. The data signal on line 42 comprises any occurrence or detection of data within a 360-degree envelope of the recovered clock. This data is then sampled with respect to the recovered clock at 0 degrees offset as shown by the arrow 46 in FIG. 2. This provides a means of sampling the three different sets of detected data and converting them into a single NRZ format signal retimed to the recovered clock phase and frequency.

Figure 3:
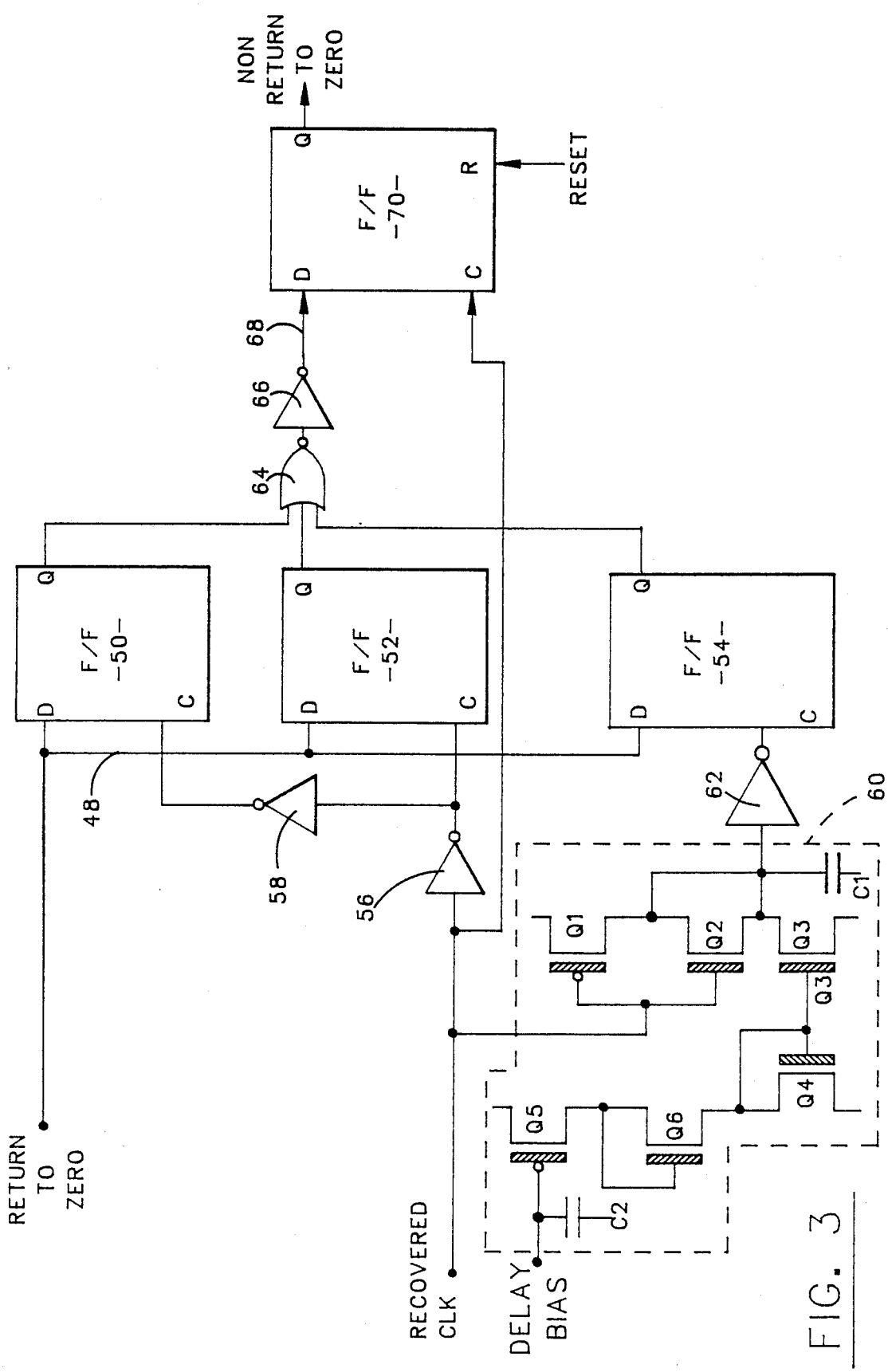
FIG. 3 illustrates a schematic view of apparatus for implementing the data recovery method of FIG. 2.

A preferred embodiment for implementing the triple sampler 16 and its operation is shown in further detail in FIGS. 3-7. Turning to FIG. 3, the RZ data is split on a data bus 48 and sampled by three D-type Flip-Flops 50, 52, and 54 which transfer data to a Q output on a positive going transition of the clock pulse. Again, for purposes of illustration only one RZ data input, that is, either P or N, is shown.

The first RZ data sample is obtained in a Flip-Flop 50 by providing the recovered clock signal, designated as RECOVERED CLK or RCLK, on the clock input C of the Flip-Flop 50. A high level "1" output is provided by the Flip-Flop 50 whenever the input RZ data is high and the recovered clock exhibits a rising leading edge or transition. Otherwise, the output from the Flip-Flop 50 is low or "0".

The second RZ data sampling occurs in a Flip-Flop 52 by providing an inverted recovered clock signal RECOVERED CLK NOT or $\overline{RCLK}$, on the C input of the Flip-Flop 52. The inverted reference signal is easily provided by transferring the RCLK signal through an inverter 56. The Flip-Flop 52 also provides a high level digital output when the data signal is high and $\overline{RCLK}$ exhibits a positive leading edge, which is now provided by an inverted clock. Since the clock for the Flip-Flop 52 is shifted by 180 degrees of phase with respect to the recovered clock, the Flip-Flop 52 provides a sampling 180 degrees out of phase for the recovered clock.

The third RZ data sampling occurs in a Flip-Flop 54 by providing a delayed recovered clock signal RECOVERED CLK LAG or RCLK LAG on the C input of the Flip-Flop 54. The delayed recovered clock signal is generated by transferring the RCLK signal through a delay circuit 60. The delay circuit 60 is configured to provide about 90 degrees of phase delay to the recovered clock signal. The Flip-Flop 54 provides a high level or "1" digital output when the delayed clock signal exhibits a positive leading edge in the presence of a high data level, which is now provided by the RCLK LAG signal. Since the clock for the Flip-Flop 54 is shifted by about 90 degrees of phase, the Flip-Flop 54 provides a sampling at 90 degrees of phase for the recovered clock.

An exemplary delay circuit 60, as shown in FIG. 3, comprises the two field effect transistors Q1 and Q2 which are activated by the recovered clock signal to generate a new signal which is delayed by the combination of the switching characteristics of the transistors and the capacitor C1. Those skilled in the art will readily understand how to construct such a delay circuit and tailor its operation to achieve a desired one-fourth UI or 90-degree phase delay. In the illustrated embodiment, the three transistors Q4-Q6 and capacitor C2 act to provide a bias supply control for the transistor Q3. The bias level of Q3 is thusly controlled, and Q1 and Q2 are used to transfer the clock signal with unity gain to the Flip-Flop 54. At the same time, the digital level at the output of the transistors Q1 and Q2 is inverted which is compensated for by an inverter 62.

While FIG. 3 illustrates a most preferred embodiment, those skilled in the art will readily understand that other phase relationships can be used to achieve the purposes of the present invention. For example, circuit elements known in the art can be employed to provide a delayed clock signal, RCLK LAG, of about one-half UI or 90 degrees delay and then invert the RCLK LAG signal clock to provide an effective negative one-half UI or −90 degrees of phase delay. This technique is illustrated in further detail in the apparatus of FIG. 4 where the input signals for the three Flip-Flops 50, 52, and 54 comprise RECOVERED CLK LAG (RCLK LAG), inverted RECOVERED CLK LAG NOT (RCLK LAG), and an inverted RECOVERED CLK NOT (RCLK) respectively. Therefore, the three Flip-Flops provide sampling at three phase separations 90 degrees apart.

The output from the three sampling Flip-Flops 50, 52, and 54 are all fed in to the three input NOR gate 64. The output of the gate will be low whenever any of the inputs are in the "1" digital state. An inverter 66 reverses the logic level output by the NOR gate 64. While it will be clear to those skilled in the art that a single OR gate could be used, the application of the NOR gate 64 and inverter 66 may be useful in inserting a small amount of delay which prevents incorrect transitions by the subsequent Flip-Flop.

This means that any data occurring during a broad time period is detected and exhibited or transferred to the output of the gate 64. Therefore, whenever a "1" appears on the RZ data stream during any of the sample times, 36a, 36b, 36c (FIG. 2), a "1" will be sent to the output of this circuit with one clock period delay. One advantage of this arrangement is that the maximum peak-to-peak jitter tolerance of this circuit is 1.0 UI (+/−180 degrees) in contrast to the typical 0.5 UI (or +/−90 degrees) of conventional data recovery circuits which rely on a single 90-degree phase shift for sampling.

The output of the NOR gate 64 is transferred to an input of a Flip-Flop 70 on the line 68 for sampling. The Flip-Flop 70 forms the final output stage of the data recovery apparatus 10. The recovered clock signal RCLK is used as the clock input for the Flip-Flop 70. This means that the Flip-Flop 70 provides a high output level during the time that the detected data is high and the recovered clock is a positive leading edge transition. This provides a NRZ data output from data detected within the three differing phase conditions and creates a single data stream output in synchronization with the recovered clock phase. A reset signal is provided for in order to reset the apparatus 10 output and begin sampling again. The reset is used at power on and as desired to set the state of the Flip-Flop 70.

Figure 4:
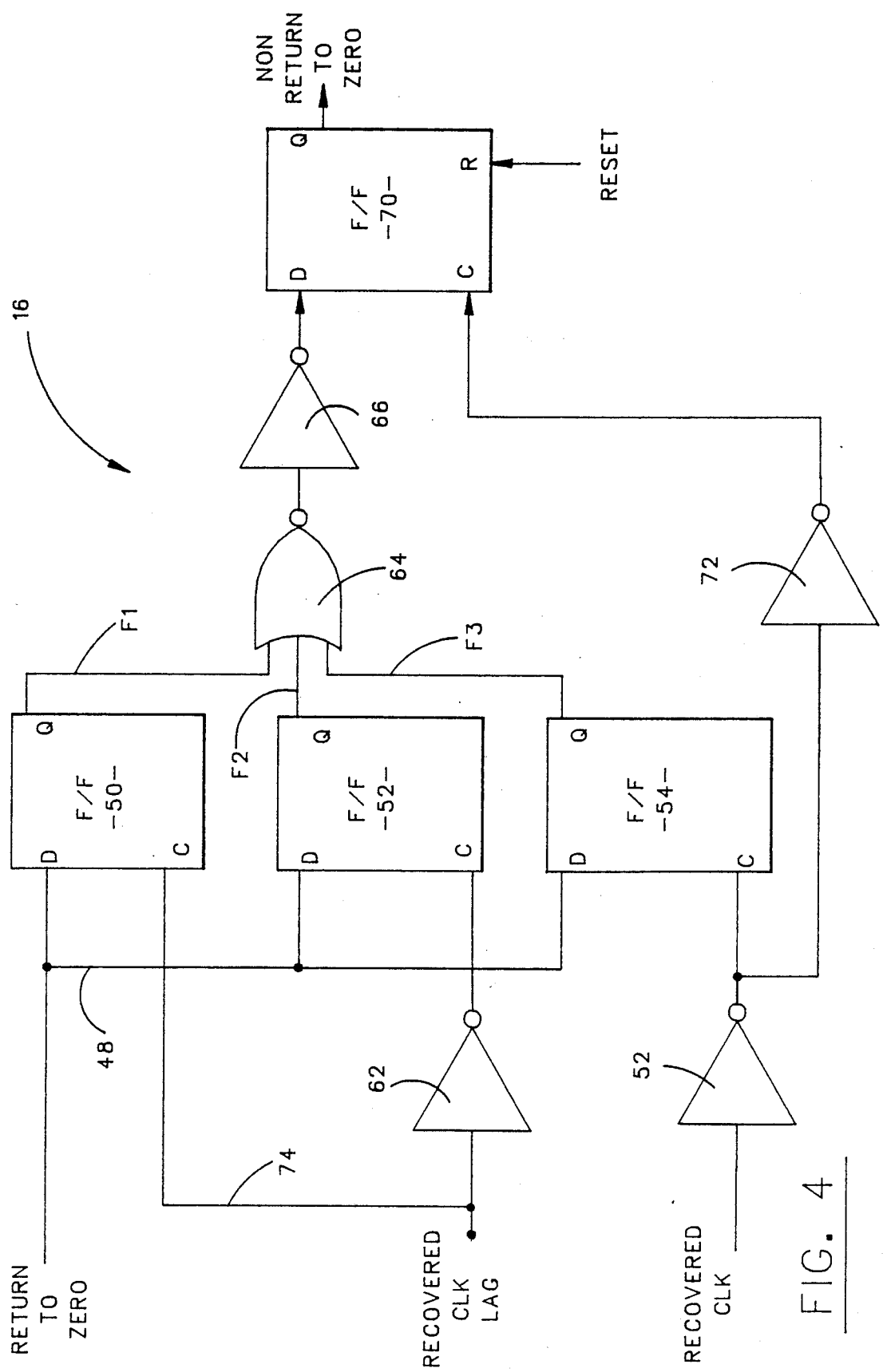
FIG. 4 illustrates an alternate embodiment for the apparatus of FIG. 3.
Figure 5:
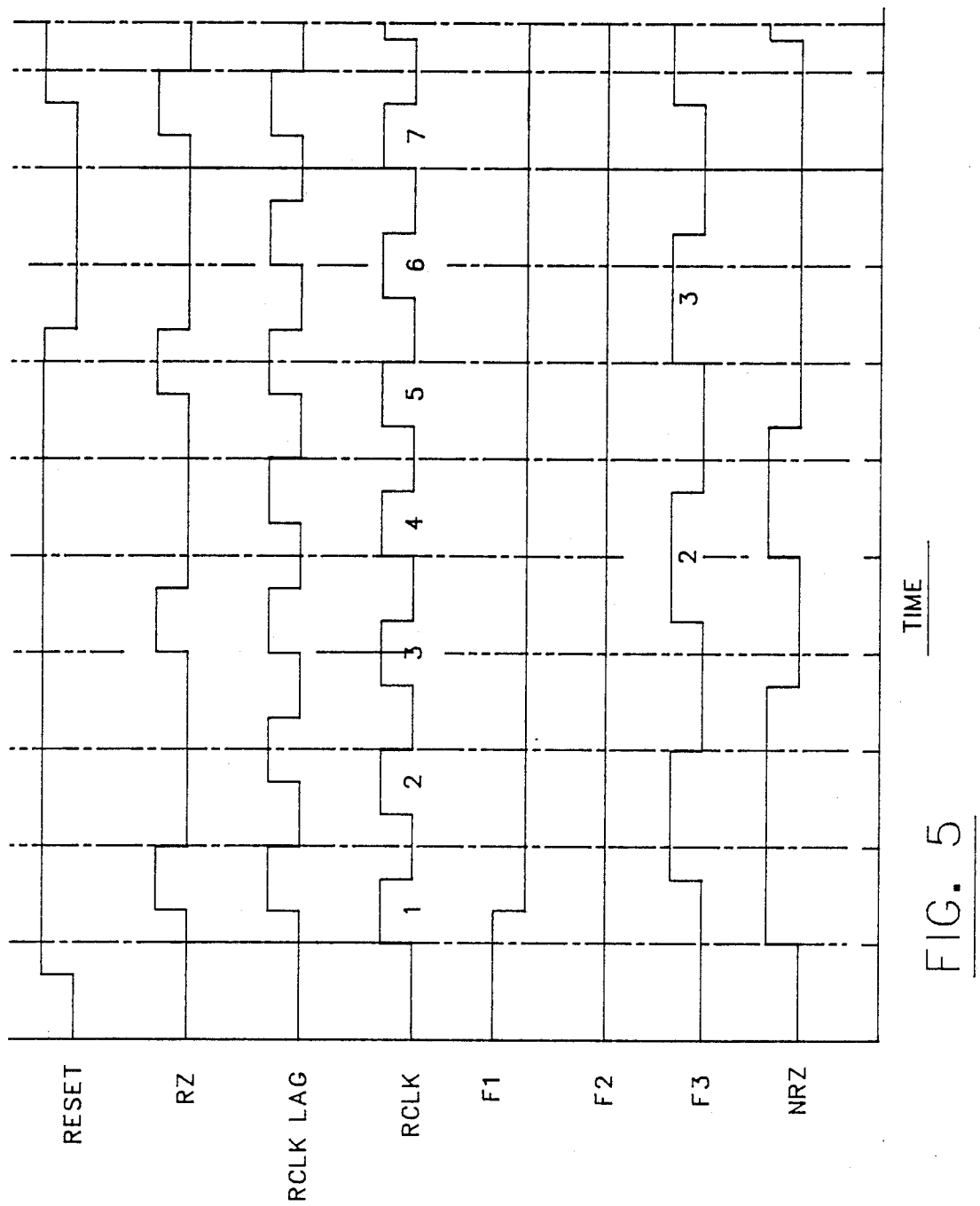
FIG. 5 illustrates input and output waveforms generated in the operation of the apparatus of FIG. 4 where the data lags a recovered clock by 90 degrees.
Figure 6:
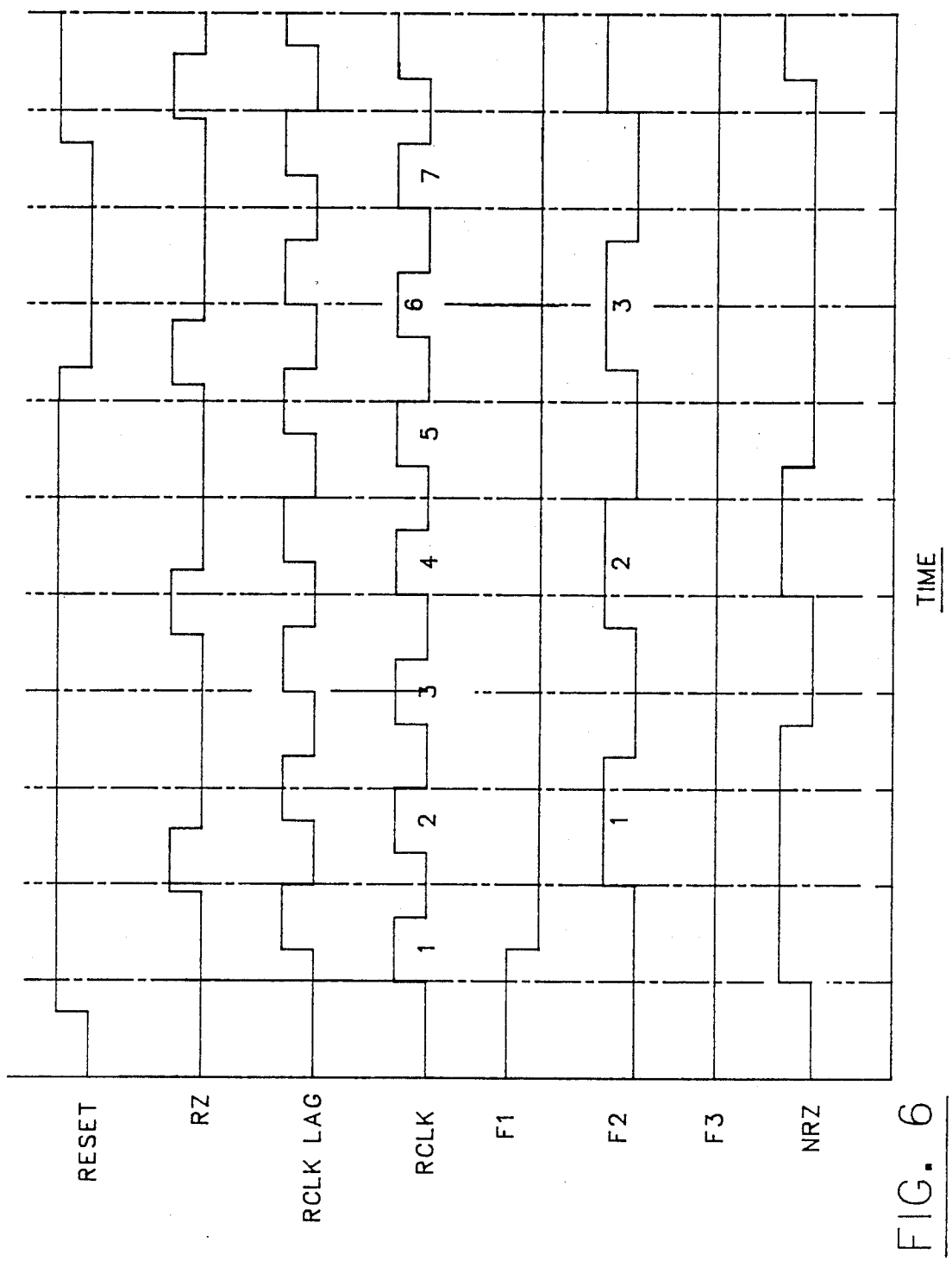
FIG. 6 illustrates input and output waveforms generated in the operation of the apparatus of FIG. 4 where the data lags a recovered clock by 260 degrees.
Figure 7:
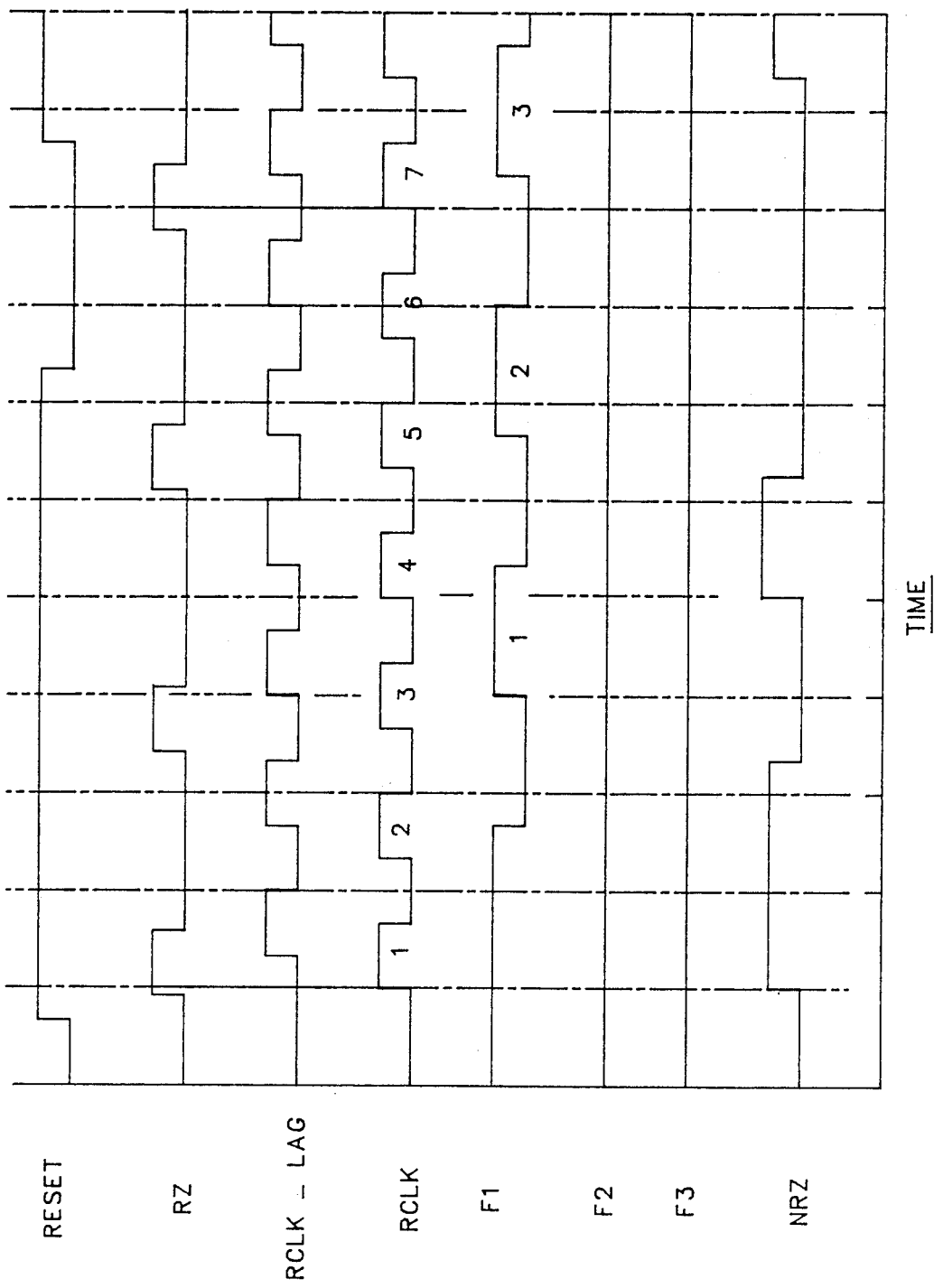
FIG. 7 illustrates input and output waveforms generated in the operation of the apparatus of FIG. 4 where the data leads a recovered clock by 90 degrees.

The operation of the triple data sampling circuit of FIG. 4 is shown in further detail in FIGS. 5–7 using predetermined signal waveforms for the RZ data, RCLK LAG, RCLK LAG, and RCLK signals. A periodic reset signal, RESET, is also employed to illustrate its operation. In FIG. 5, the RZ data signal is 90 degrees out of phase with the recovered clock or aligned with the 90 degree delayed recovered clock signal RCLK LAG. In this situation the output of the three Flip-Flops 50, 52, and 54 are shown as lines F1, F2, and F3 respectively and the starting state of each Flip-Flop is allowed to be random.

In FIG. 5, the output of Flip-Flop 50, F1, is "0" or low, except in a beginning arbitrary state, because the data is not high when the leading edge of the RCLK LAG arrives during clock cycles. The output of the Flip Flop 52, F2, is also low because the RZ data is "0" when the RCLK LAG positive transition occurs. The output of the Flip-Flop 54, F3, goes high during clock cycles 1, 3, and 5 because the RCLK signal makes a positive transition while the RZ data is high. The output F3 stays high, as shown at F3 cycles 1, 2, and 3, until the end of each clock cycle, that is, until the next positive transition which occurs when RZ is "0". The Flip-Flop 54 output stays high until the end of the clock period even though the data has dropped back to "0" during the cycle. The three outputs F1, F2, and F3 are combined in the OR gate 64 and its output sampled by the Flip-Flop 70 to provide the NRZ data. The NRZ data is high when any of the outputs F1, F2, or F3 are high and there is a positive RCLK transition. In FIG. 5, the NRZ data is high during RCLK cycle 1 since F1 is high. The NRZ data stays high through RCLK cycle 2 since F3 was high during part of this cycle. The NRZ data drops low in RCLK cycle 3 but goes high in RCLK cycle 4 where the F3 output is already high. The NRZ data output stays low through RCLK cycle 6 because the RESET signal resets the Flip-Flop 70.

In FIG. 6, the RZ data signal lags the RCLK signal by about 260 degrees. The output of Flip-Flop 52, F1, is "0" or low because the RZ data is not high when the leading clock edge of the RCLK LAG signal arrives. The output of the Flip-Flop 52, F2, goes high when the RCLK LAG signal goes high just after the data signal makes a transition to high. The output of the Flip-Flop 54, F3, stays low because the RZ data is low when the RCLK cycle begins and the output of the Flip-Flop 52 stays low until the end of the clock cycle. Therefore, F3 stays low until the end of the RCLK period even though the data has gone to "1". The three outputs F1, F2, and F3 are again combined and sampled to provide the NRZ data. In FIG. 6, the NRZ data is high during RCLK cycle 1 since F1 is high. The NRZ data stays high through RCLK cycle 2 since F3 was high during the positive transition part of this cycle. The NRZ data drops low in RCLK cycle 3 since RZ was "0" during transition, but goes high in RCLK cycle 4 where the F3 output is already high during the clock transition. The NRZ data output stays low through RCLK cycle 6 because the RESET signal again resets the Flip-Flop 70.

In FIG. 7, the RZ data signal leads the RCLK signal by about 80 degrees. The output of Flip-Flop 50, F1, is initially high and stays high because RZ is still high when the leading edge of the RCLK LAG signal arrives. The outputs F2 and F3 of the Flip-Flops 52 and 54, stay low because the RZ data is low each time RCLK LAG and RCLK positive transitions occur and these outputs stay low until the end of each clock cycle. The three outputs F1, F2, and F3 are again combined and sampled to provide the NRZ data. In FIG. 7, the NRZ data is high during RCLK cycles 1 and 2 since F1 is high. The NRZ data drops low in RCLK cycle 3 but goes high in RCLK cycle 4 where the F1 output is high. The NRZ data output stays low through RCLK cycle 6 because the RESET signal again resets Flip-Flop 70.

The above description for the operation of the embodiment of FIG. 4 is provided for purposes of clarity in illustration of the invention. The apparatus of FIG. 3 is generally more preferred due to the timing relationships of the clock, delayed clock, and inverted signals. If the same input signals were applied to the circuit of FIG. 3, FIG. 5 would show the same output waveforms except that the F2 and F3 waveforms would be reversed. In this application, FIG. 6 would show F1 to look like F2, F2 would look like F3 and F3 would look like F1. In FIG. 7, F1 would be shifted to the left by about 90 degrees, while F3 would look like F1, and F2 would remain unchanged.

The method and apparatus of the present invention provides improved data recovery due to improved detection of data over a broader capture range, and with improved immunity to data jitter.

The triple Sampler 16 scheme makes acceptable instantaneous phase error between the RZ data and RCLK as high as +/−0.5 UI (+/−180 degrees) or 1.0 UI jitter. This is in contrast to the conventional +/−0.25 UI limitation and improves jitter tolerance by at least a factor of 2. The triple sampling method of the invention also relaxes phase tracking requirements for the PLL 20 and allows the closed-loop bandwidth to be adjusted for optimal jitter performance.

The data recovery method used in the triple sampler 16 relies on the provision of a recovered clock which is extracted from the RZ data stream by the PLL 20. The PLL 20 must be able to reliably and accurately lock onto the frequency and phase of the data stream and provide a clock signal commensurate with the timing of the data in the RZ data stream. The PLL 20 allows the triple sampler 16 to continuously detect data in the presence of jitter.

The method of the invention can be advantageously applied using a variety of circuits to implement the PLL 20 which provides a typical phase-locking function used in phase/frequency tracking circuits. The output RZ data is monitored for phase and frequency, and this information is used to adjust the output of an internal loop frequency source. The source frequency is typically provided by a voltage controlled oscillator and becomes the recovered clock, matching the phase and frequency of the data, for use by the triple sampler 16. However, a new sequential-logic phase/frequency detector and current controlled oscillator apparatus has been discovered which improves clock recovery.

Figure 8:
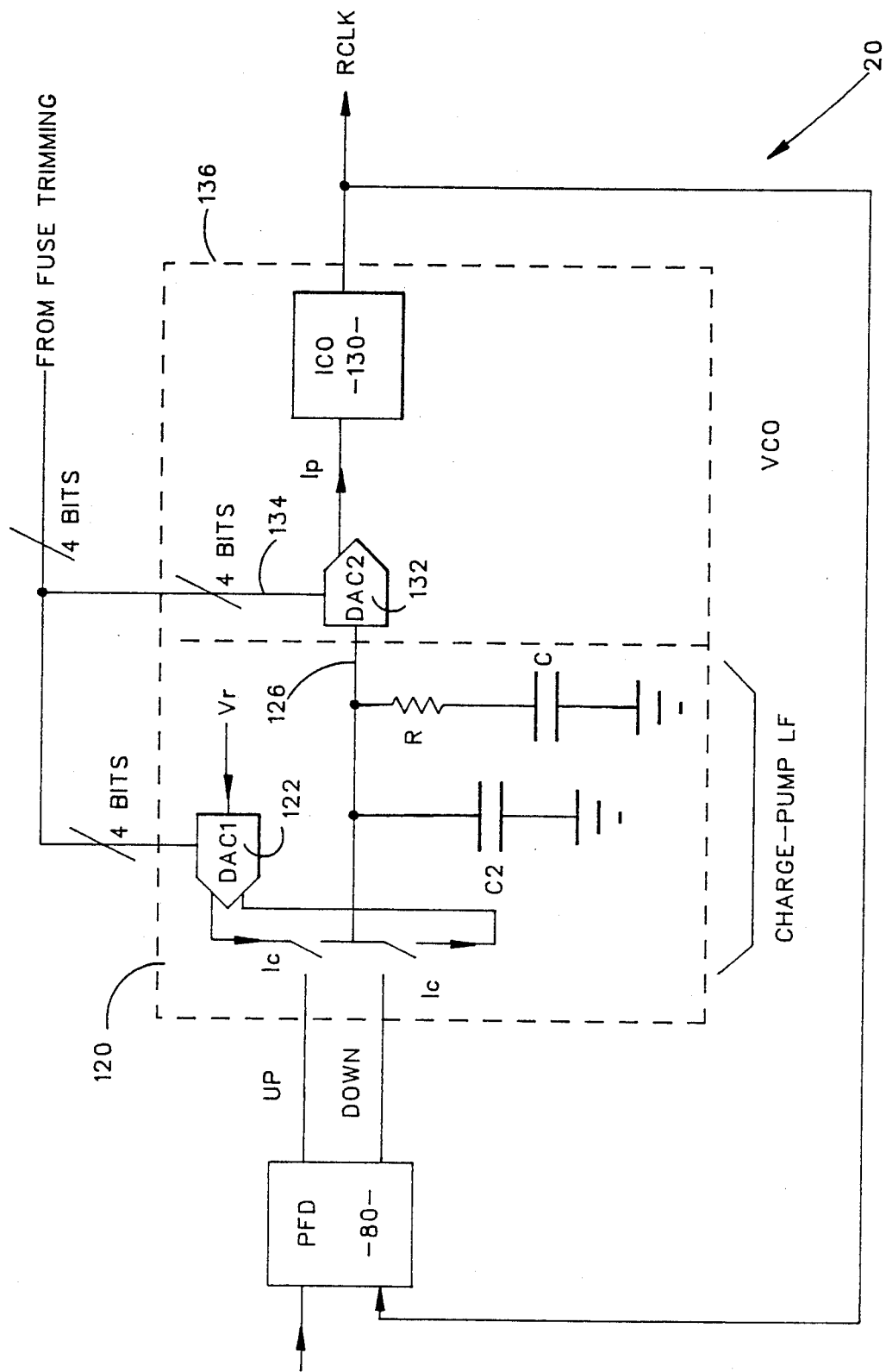
FIG. 8 illustrates a schematic view of an apparatus for implementing the phase-locked loop of FIG. 1.

A preferred embodiment for implementing the functions of the PLL 20 is shown in FIG. 8. In FIG. 8, the PLL 20 uses a data activating phase/frequency detector 80 (PFD). a charge-pump loop filter 120 and a current controlled relaxation oscillator (ICO) 130. Two current controlling Digital-to-Analog Converters (DACs) 122 and 132 are used to trim the ICO center frequency and the PLL closed-loop bandwidth respectively. The PFD 80 compares the phase difference between the RZ data on the lines 14a and 14b and the ICO output, RCLK, and uses the result to alter the current sources in the charge-pump to charge or discharge the large capacitor C. The voltage change on the capacitor C drives the ICO output frequency to a direction to reduce the measured or perceived phase difference. A small capacitor $C_2$ is generally used to suppress ripple encountered in the charge-pump loop filter 120.

The capture range of the PLL 20 is approximately the same as the ICO frequency range because the phase/frequency detector employed compares not only the phase difference, but also the frequency difference. When a pulse is present in the RZ data the PFD 80 is activated as follows: if the phase of RZ leads RCLK phase, the UP output will be "ON" for a duration proportional to the phase difference; if RZ data lags RCLK, the DOWN output will be "ON" in the same fashion. Output logic prevents the UP/DOWN outputs from being "ON" simultaneously. This PFD embodiment has 1-bit of memory to keep the last comparison result to eliminate an output phase jump at a beat frequency when the two-input signals have different frequencies. When no pulse appears on RZ, the two outputs will be deactivated and the ICO is free running until the next pulse comes.

Figure 9:
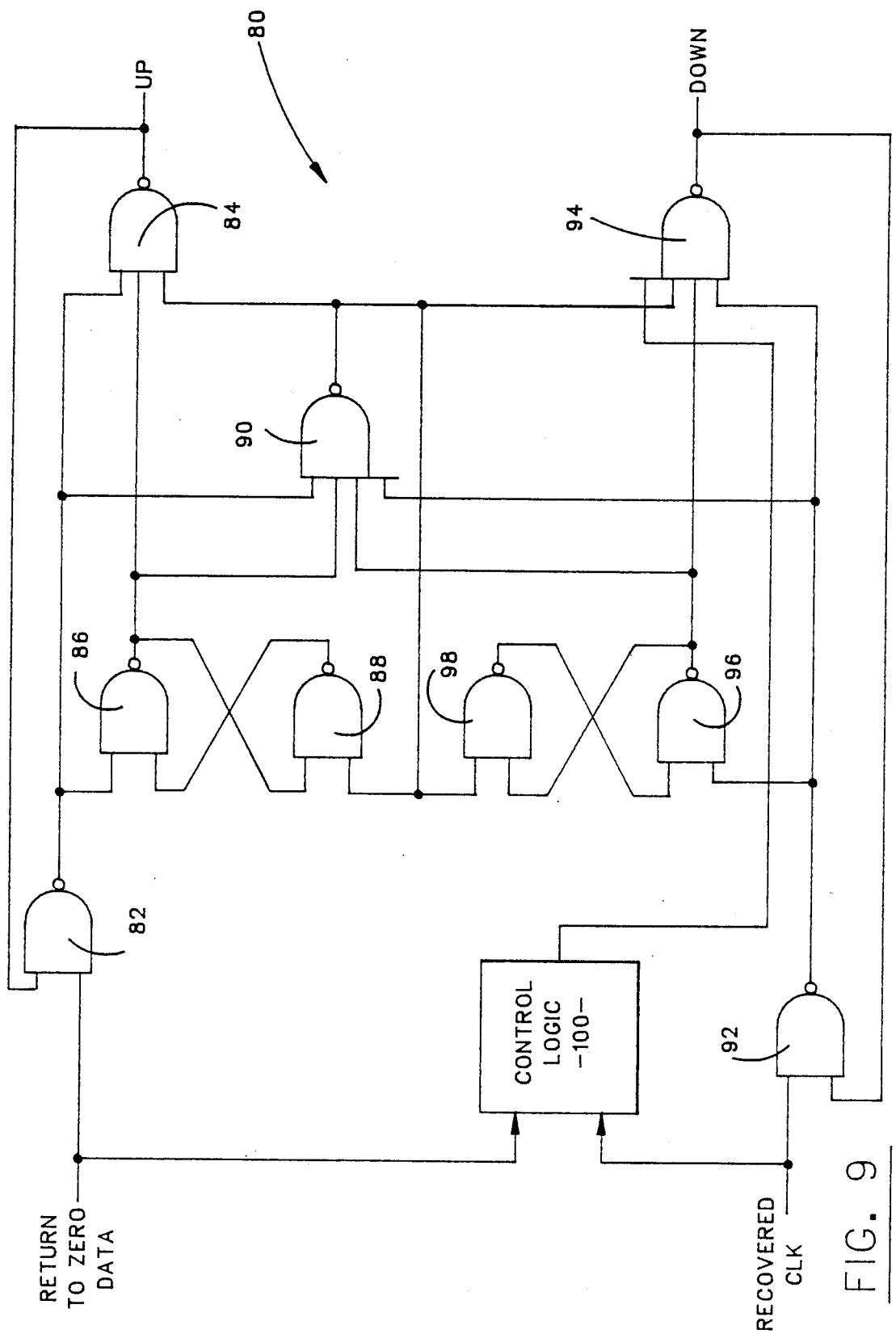
FIG. 9 illustrates an overall schematic of a sequential-logic phase/frequency detector used for implementing the data recovery apparatus of FIG. 1.

In the preferred embodiment of the invention, the PFD 80 comprises a type IV sequential-logic phase/frequency detector which is configured to be data activating. This is shown in the overview of FIG. 9, where control circuitry 100 acts to activate the function of the logic elements only when data is present on the RZ data input and a recovered clock signal, RCLK, is applied. In addition, two OR-type logic gates are added in conjunction with signal inverters to the output of the PFD 80 to assure mutually exclusive activation of either the UP of DOWN output lines.

Type IV phase detectors are known in the art and described in textual materials such as "Phase Locked Loops" by Roland Best Published by McGraw-Hill in 1984 on pages 8 and 68–70. As shown in these materials, a type IV phase detector is capable of having a very large capture range and being adjusted to accommodate very high frequencies. However, as stated before, such phase detectors are not capable of locking onto the desired phase shifts when the two signals are rapidly changing or in the presence of jitter due to the wild frequency adjustments made when data is not detected. The present invention avoids these drawbacks by using a new sequential-logic design.

Figure 10:
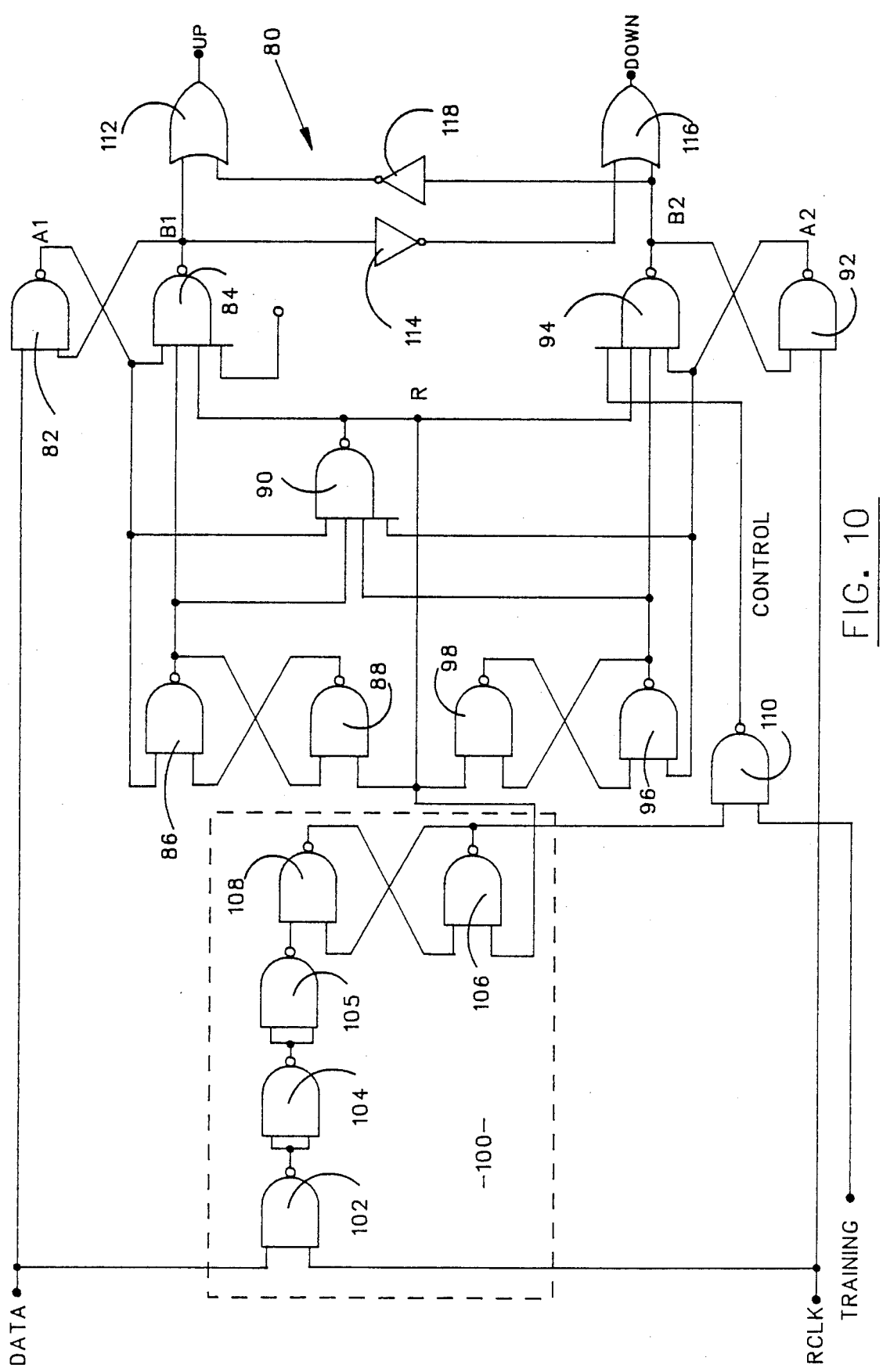
FIG. 10 illustrates a schematic view of an apparatus for implementing the phase/frequency detector of FIG. 9.

Logic circuitry useful in implementing the embodiment of FIG. 9 is shown in further detail in the schematic of FIG. 10. In FIGS. 9 and 10, a sequential-logic or type IV phase detector 80 is shown using a pair of input gates 82 and 92 for receiving the RZ data and recovered clock, respectively. The gates 82 and 92 each comprise two-input NAND gates which are connected with NAND gates 84 and 94 to form input/output latches. Therefore, the output of the NAND gate 82 is connected to an input of the NAND gate 84 and the output of the NAND gate 84 is connected back to one input of the NAND gate 82. The NAND gates 92 and 94 are similarly interconnected as illustrated.

At the same time, the output of the NAND gates 82 and 92 are connected to other data latches formed by the NAND gates 86 and 88, and 96 and 98, respectively. The outputs of these latches are connected to inputs for NAND gates 84 and 94, and to input ports for a reset gate 90. The gate 90 comprises a four-input type NAND gate, the output of which is connected to inputs for the NAND gates 84 and 94.

Using previous sequential-logic phase detector designs, data and clock inputs are received and the phase/frequency of the two compared regardless of the arrival times. This leads to problems with the PLL 20 when the data sufficiently leads the clock. When there is no data present, the PLL assumes the clock is offset and attempts to adjust the clock even though there is no data to lock onto.

As shown in FIG. 10, the addition of control logic 100 to the previously discussed apparatus provides for activation of the sequential-logic only when data is present. Therefore, the phase detector 80 more accurately tracks the data and does not vary significantly outside of the more limited capture range. making response quicker.

In FIG. 10, the control logic 100 comprises an input NAND gate 102 which receives the RZ data and the recovered clock signal, fed back from the PLL 20 output. If the data is present on one gate 102 input during a recovered clock cycle, then the output of the NAND gate 102 is low. This output is connected to a control latch comprising the two interconnected NAND gates 106 and 108. Where desired, additional gates 104 and 105 or inverters (not shown) can be employed in the input to the NAND gate 108 in order to effect a delay to the activation and presentation of the signal going to the input of the gate 108. Delay prevents an input prior to state adjustment of other gates and latches in the PFD 80, as required.

The control input latch (106, 108) provides an output to a two-input NAND gate 110 which has an output connected to the four-input NAND gate 94. The other four-input NAND gate, 84, is connected to a permanent high or "1" input on one of the four inputs. Alternatively, the gate 84 can be configured as a three-input NAND gate. This allows the NAND gate 110 output to act as a controlling trigger or reset for the gate 94.

When a pulse is present at both the RZ data and RCLK inputs, the decision logic circuit 100 activates the sequential-logic phase detector 80. The phase detector observes the arrival of the falling edges of the data and RCLK signals. If the falling edge of the RZ data leads the falling edge of the RCLK, then the UP output line is set high (or low) until the arrival of the next RCLK falling edge. The duration of the UP pulse is approximately equal to the phase difference between the RZ data and RCLK signals.

On the other hand, if the RZ data falling edge lags the falling edge of the RCLK signal, then the DOWN line is set high. The duration of the DOWN pulse will, likewise, be determined by the time of arrival of the next RCLK falling edge. When no pulse is present at either one or both of the RZ data and CLK inputs, the phase detector 80 is deactivated and no signal is output.

Figure 11:
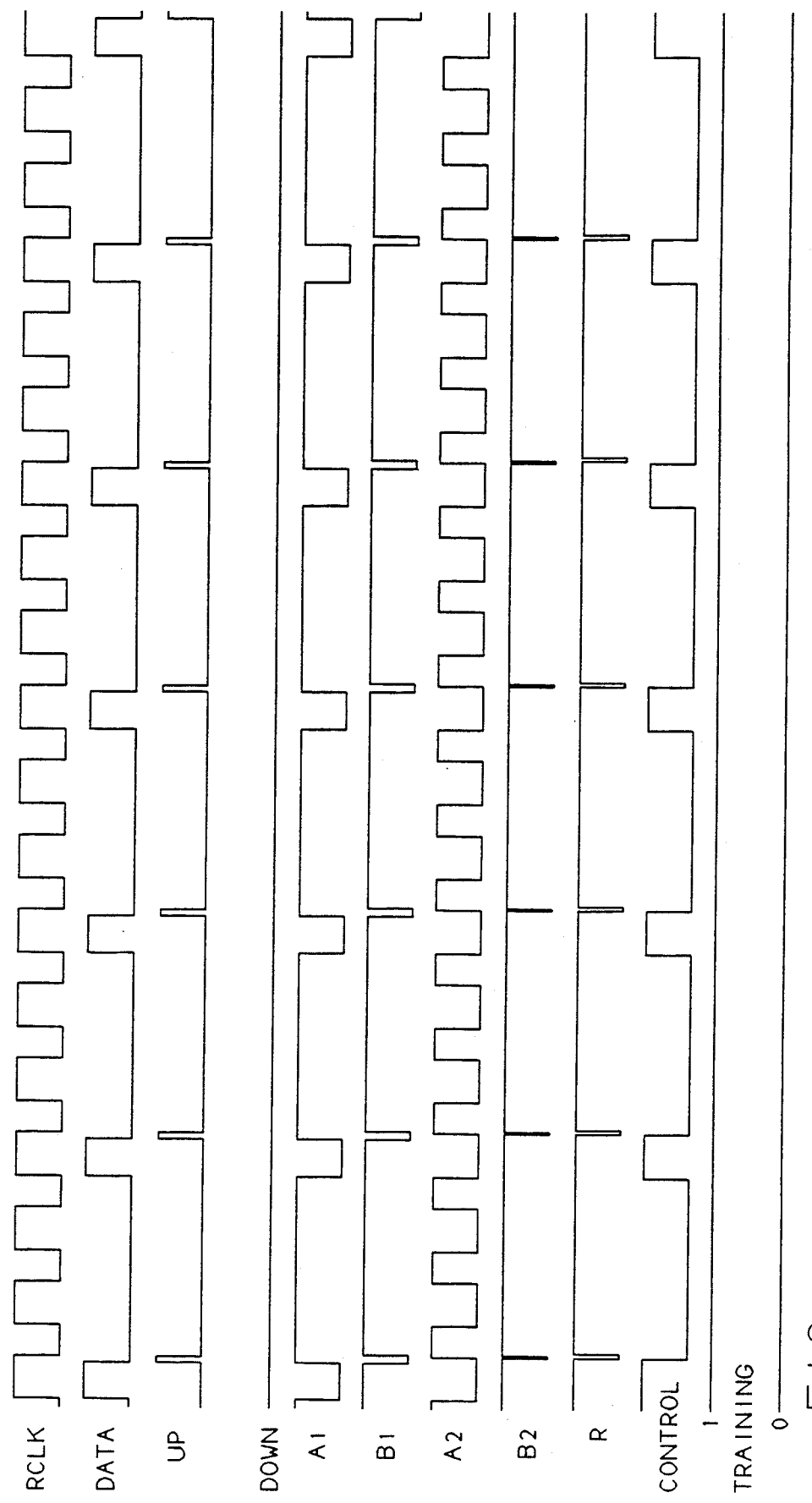
FIG. 11 illustrates waveforms representative of application of the phase/frequency detector of FIG. 10 where the data phase leads the recovered clock phase.

The operation of the circuit of FIG. 9 is illustrated in the waveforms of FIGS. 11-16. In FIG. 11, the input RZ data phase leads that of the recovered clock signal RCLK, by a few degrees. The "training" input to the NAND gate 110 is set high to enable the normal operation mode of the PFD 80. The output of the NAND gates 82 and 92 are shown on the lines labeled A1 and A2 respectively. The output of the NAND gates 84 and 94 are shown on lines B1 and B2 respectively and the resulting UP and DOWN outputs are shown as labeled. The output of the NAND gate 90 is shown as the line labeled R and the output of the NAND gate 110 is shown on the line labeled CONTROL. It is readily apparent that the phase/frequency detector provides high or "1" digital values on the UP output to adjust the phase/frequency of the RCLK signal produced by the PLL 20 to bring it in phase with the RZ data timing.

Figure 12:
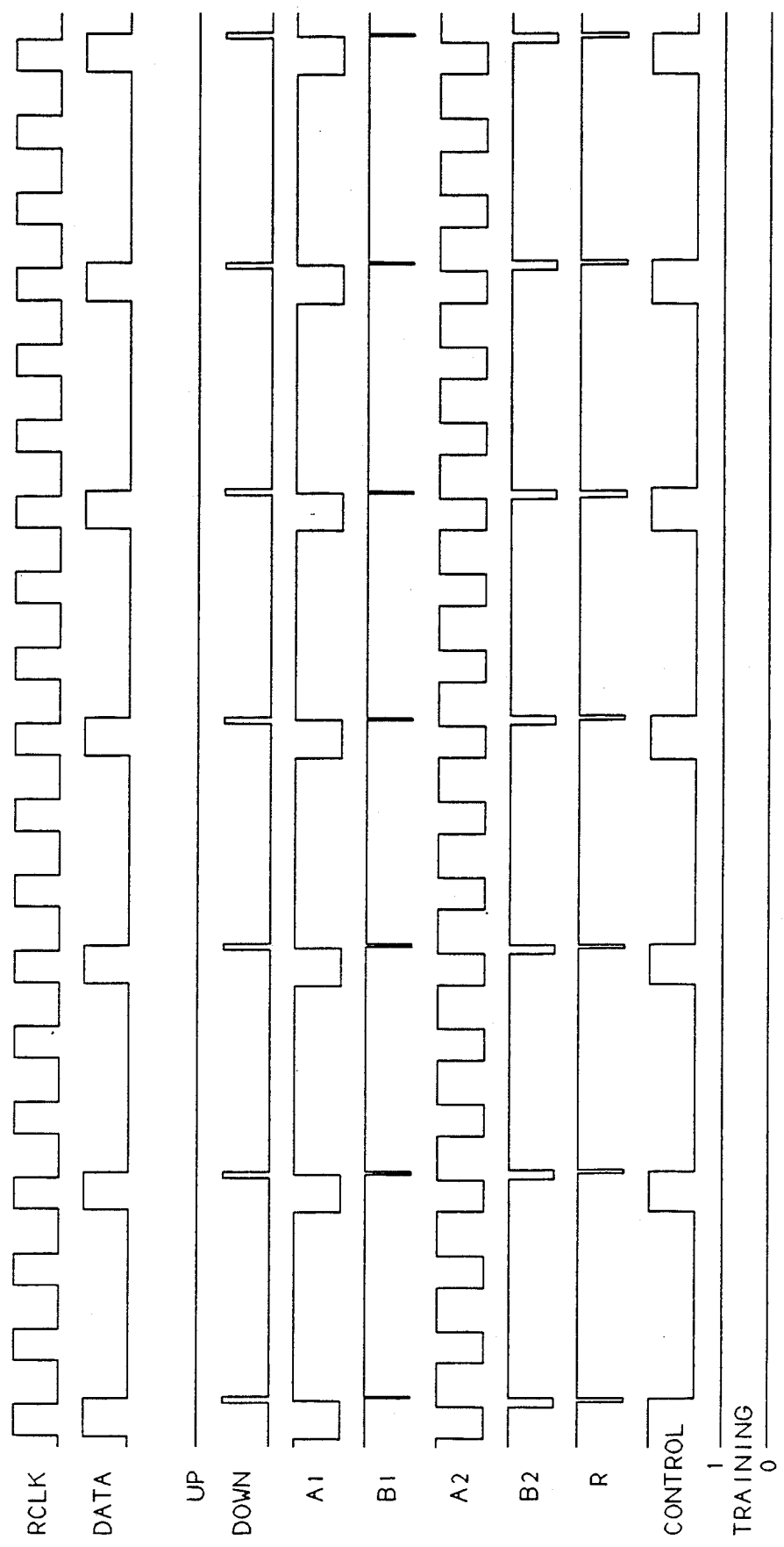
FIG. 12 illustrates waveforms representative of application of the phase/frequency detector of FIG. 10 where the data phase lags the recovered clock phase.

In FIG. 12, the RZ data phase lags the RCLK signal, and the training input is still set high. The output of the NAND gates 82, 84, 92, and 94 are shown, as before, on the corresponding lines labeled A1, B1, A2, and B2. Here the output of the DOWN line goes high to adjust the recovered clock signal phase to align with that of the RZ data.

Figure 13:
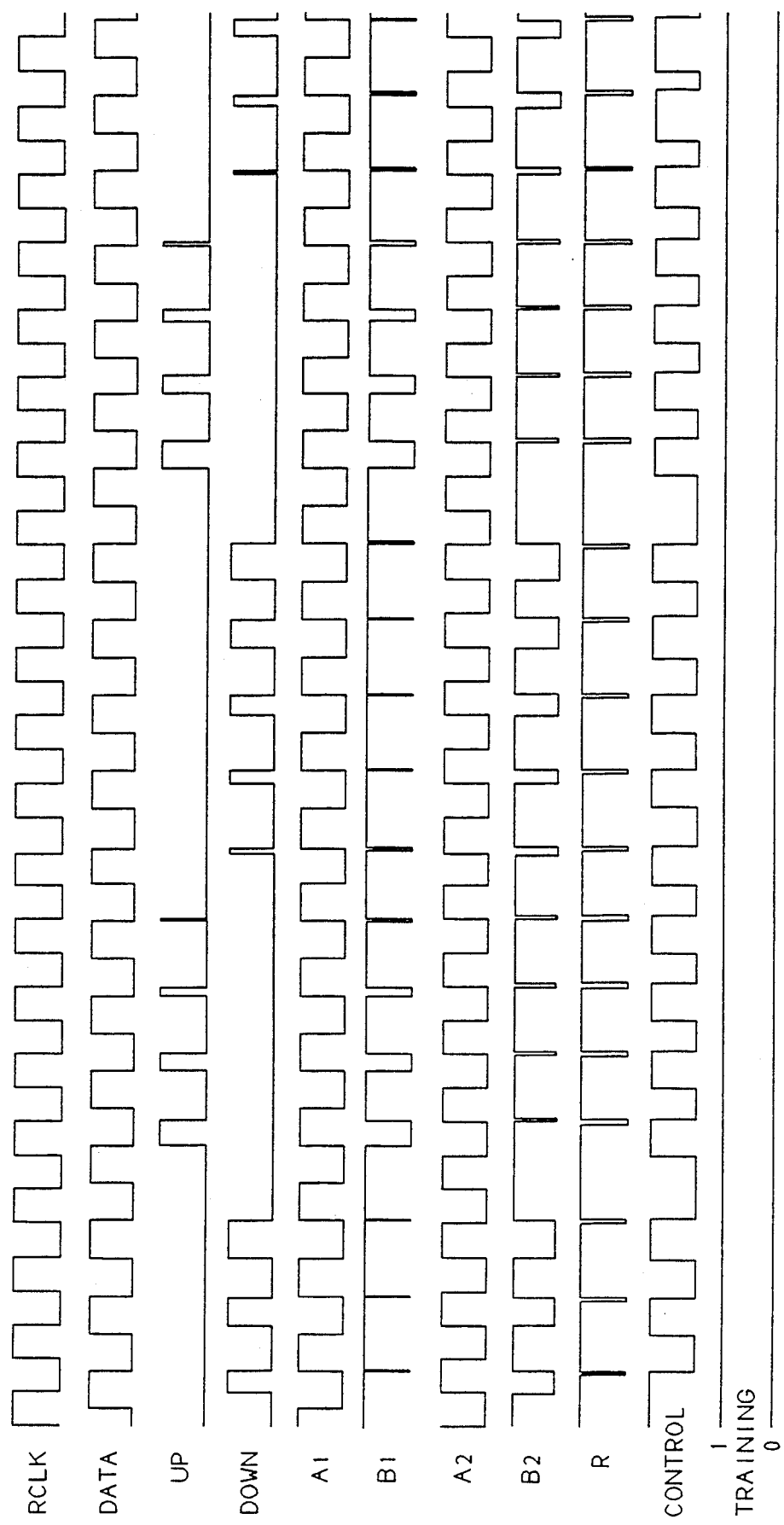
FIG. 13 illustrates waveforms representative of application of the phase/frequency detector of FIG. 10 where the recovered clock frequency is higher than the data frequency.

In FIG. 13, the RZ data frequency is lower than the RCLK signal frequency. In the operating mode, the output of both the UP and DOWN lines are activated at different phase points to adjust the recovered clock to align with the timing of the RZ data. In this operating mode, the frequency of the recovered clock produced by the PLL 20 is adjusted both up and down until the PLL 20 locks onto the desired frequency.

Figure 14:
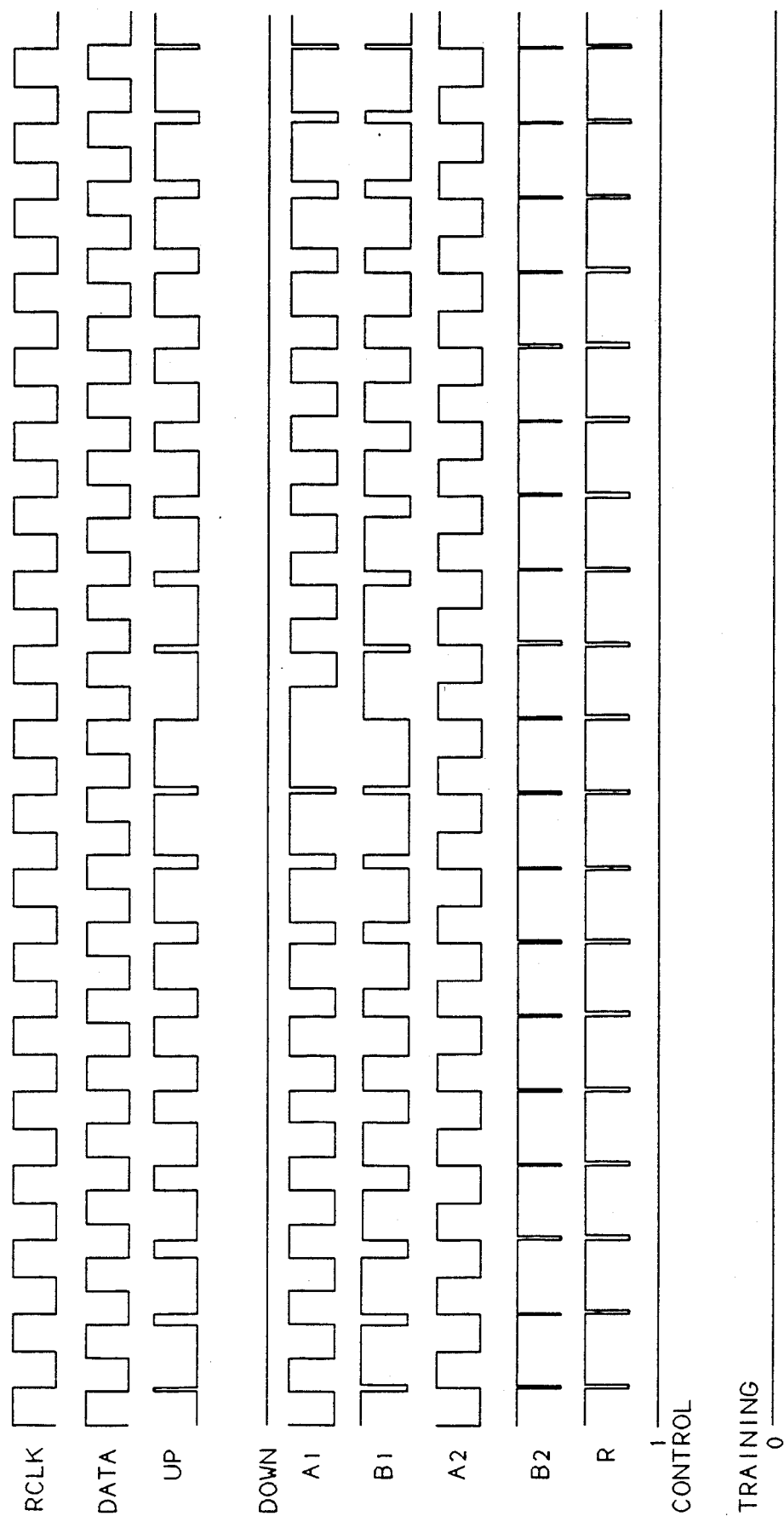
FIG. 14 illustrates waveforms representative of application of the phase/frequency detector of FIG. 10 where the recovered clock frequency is lower than the data frequency.

In FIG. 14, the RZ data frequency is higher than the RCLK signal frequency. The training mode has been entered by setting the training input low which drives the control input high. In the training mode, the output of the UP line is activated at different phase points to adjust the recovered clock to align with that of the reference source 24 data. In this mode the frequency of the recovered clock produced by the PLL 20 is sequentially adjusted up until the PLL 20 locks onto the desired frequency.

Figure 15:
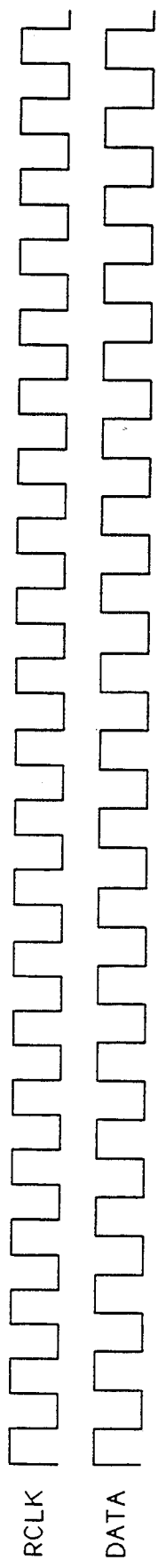
FIG. 15 illustrates waveforms representative of application of the phase/frequency detector of FIG. 10 where the recovered clock frequency is higher than the data frequency and the circuit is in training mode.
Figure 16:
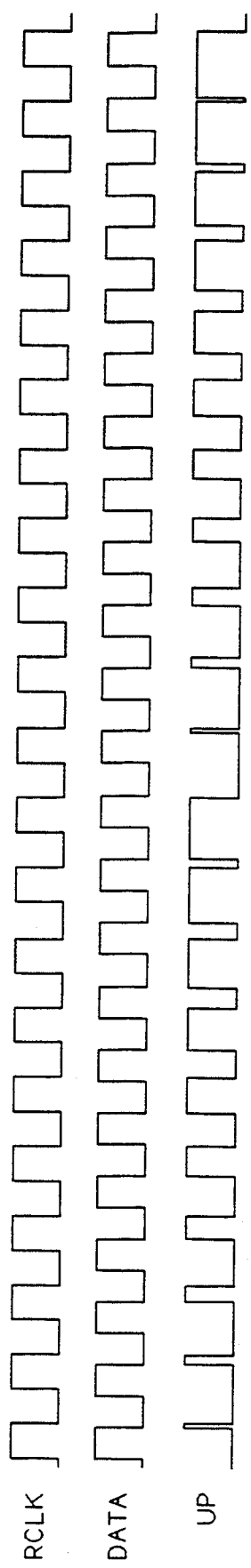
FIG. 16 illustrates waveforms representative of application of the phase/frequency detector of FIG. 10 where the recovered clock frequency is lower than the data frequency and the circuit is in training mode.

In FIG. 15, the "training" input to the NAND gate 110 is set low to deactivate normal operation of the PFD 80 and set it in "training mode". The RZ data frequency is lower than the RCLK signal and the output of the DOWN line is illustrated accordingly. In FIG. 16, with the "training" input low, the RZ data frequency is higher than the RCLK signal. The output of the UP line is illustrated as changing until the frequency is locked onto.

The phase/frequency detector 80 is also configured with logic gates on the UP and DOWN output lines which prevent both UP and DOWN lines from being activated simultaneously. Only three output states are allowed, those being UP, DOWN, or NO signals exclusively. This is accomplished, as shown in FIG. 10, by connecting the output from NAND gate 84 to one input of a two-input OR gate 112 and an inverter 114. The output of the NAND gate 94 is then connected to one input of a two-input OR gate 116 and to an inverter 118. The outputs of the inverters 114 and 118 are connected to the second inputs of the OR gates 116 and 112, respectively. This logic combination prevents one line from going high when the other line is already high. That is, only one of the "UP" or "DOWN" outputs is allowed to be high or provide a signal at any time. The result is a phase detector that has phase and frequency tracking that allows large capture range while locking in effectively and not producing irregular or inappropriate output signals.

Returning now to FIG. 8, the output of the phase/frequency detector 80 is used to provide UP/DOWN adjustment of a Voltage Controlled Oscillator (VCO) frequency source 136. A typical VCO used in phase-locked loops comprises a voltage controlled oscillator employing a varactor, which varies its frequency in accordance with an input voltage level established by the phase detector output.

One alternate approach is to use a charge-pump loop filter in combination with a current controlled oscillator (ICO). In this configuration, the UP and DOWN signals are used to alter the state of the charge-pump which in turn is used to establish the current used to drive the ICO. The charge-pump converts the logic states of the PFD 80 into analog control signals. The charge-pump loop filter 120 essentially comprises a three-state switch that is controlled by the three PFD 80 output states.

However, the current control on the ICO needs to be preset to obtain a relative central frequency from which the ICO and, therefore, RCLK will vary. In typical circuits, the ICO is set at a base frequency and adjusted upward as necessary. In the present invention, the ICO is adjusted both up and down from a central frequency so as to minimize frequency variations to one-half the total PLL 20 bandwidth.

The present invention uses the component matching properties of a monolithic PLL circuit design to adjust the center frequency of the VCO 136 with a digitally controlled current trimming network. A suitable digital code is obtained from a measurement of the VCO output frequency (RCLK) and also used to adjust the loop filter bandwidth through another current source trimming network with the same digital code.

Figure 17:
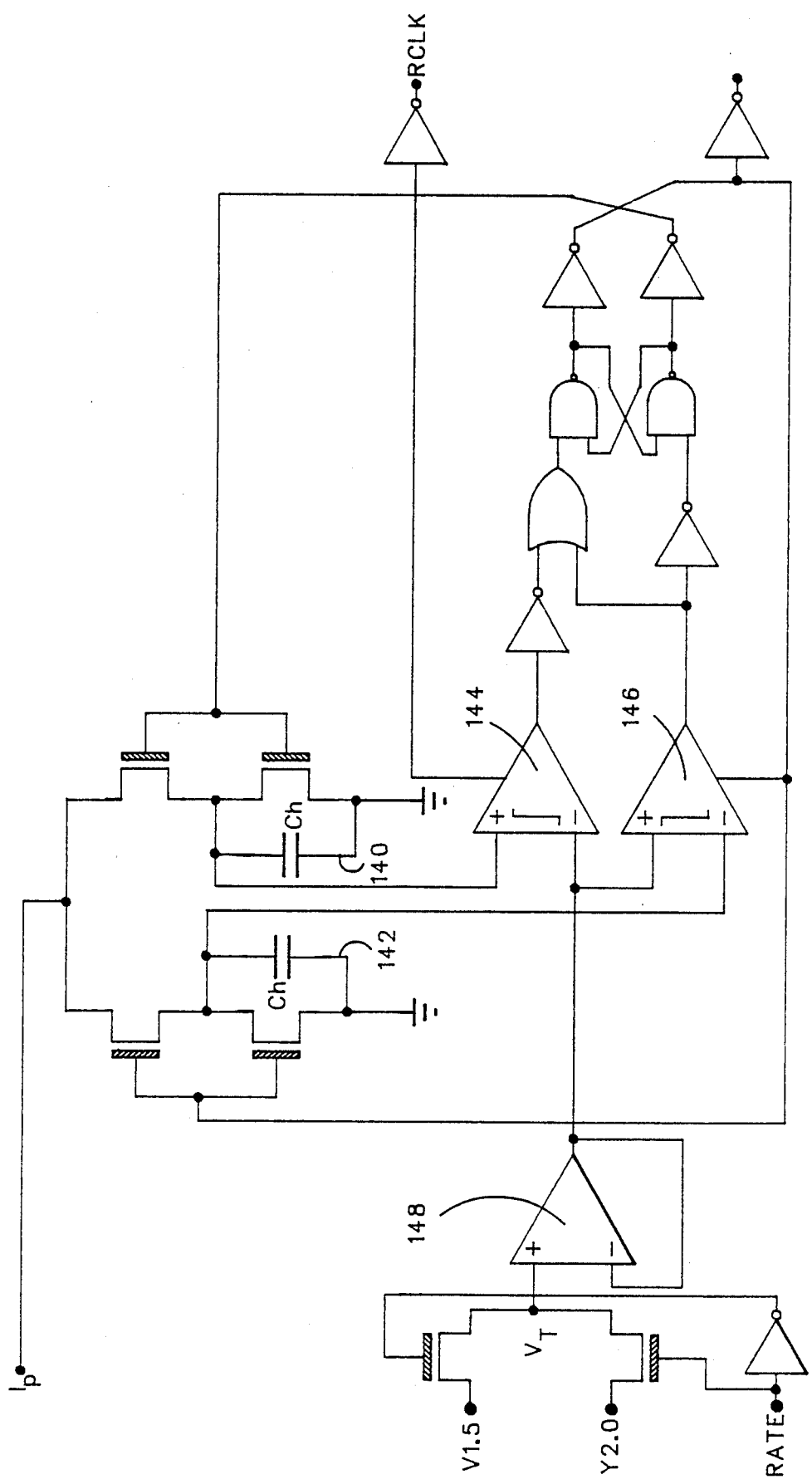
FIG. 17 illustrates a current controlled oscillator for use in the circuit of FIG. 17.

The VCO 136 comprises two principle parts. The first is a relaxation ICO 130 whose frequency is controlled by an input current $I_p$ as shown in FIG. 8. An exemplary current controlled oscillator found useful for this application is illustrated in FIG. 17. In FIG. 17, two identical holding capacitors, 140 and 142, and two autoreset comparators, 144 and 146, provide nearly a 50 percent duty cycle on the recovered clock output without a dividing counter. The center frequency is switchable from one central frequency, on the order of 1.544 MHz, to another, on the order of 2.048 MHz, by changing the trigger level of the comparators 144 and 146 through the OP-AMP 148.

The second part of the VCO 130 is a multi-bit, here 4-bit, current supplying DAC 132 which provides the VCO 136 with an input voltage $V_f$ as its reference voltage. The DAC 132 functions as a programmable voltage-to-current converter to adjust the transfer curve between the input reference voltage $V_f$ and output current $I_p$ which is transferred to the ICO 130 in response to different digital input codes.

The center frequency, $f_o$, and gain, $K_o$, for the VCO 136 can be expressed by the relationships:

$$f_o = (\tfrac{1}{4} V_T)(I_p/C_h) \qquad (1)$$

$$K_o = 0.8\pi f_o \qquad (2)$$

Another DAC 122 is used in the charge-pump loop filter 120 with a preset reference voltage $V_r$ to provide a suitable injection current $I_c$ which determines the closed-loop bandwidth of the PLL 20. The bandwidth can be expressed by the relationships:

$$f_n^2 = (K_o/8\pi^3)(I_c/C) \qquad (3)$$

$$\xi = \pi R C f_n \qquad (4)$$

Returning again to FIG. 8, the PLL 20, in this configuration, comprises a second order loop in which a damping factor $\xi$ is determined in the above equation by the resistor R, capacitor C, and PLL closed-loop bandwidth $f_n$. The two DACs 122 and 132 are made identically by being manufactured as a monolithic circuit and layout, on a common substrate or wafer, with the intention to adjust these key circuit parameters.

Since on chip component values of capacitors and polysilicon resistors vary $+/-25$ percent from one wafer or substrate lot to another, the VCO 136 center frequency for monolithic manufacturing will vary up to $+/-60$ percent from a designed value. Additionally, the loop filter bandwidth will vary $+/-60$ percent because its value is determined by its capacitor Cp and charge current Ip which are also affected by manufacturing variations. It is very desirable to keep the loop bandwidth constant to assure good jitter tolerance.

In the present invention, the current $I_p$ for the ICO 130 is established by a fuse trimming network that also adjusts the current available to drive the DAC 122. This has advantages for stabilization and identical adjustment of the DACs 122 and 132 in integrated circuit implementation.

Figure 18:
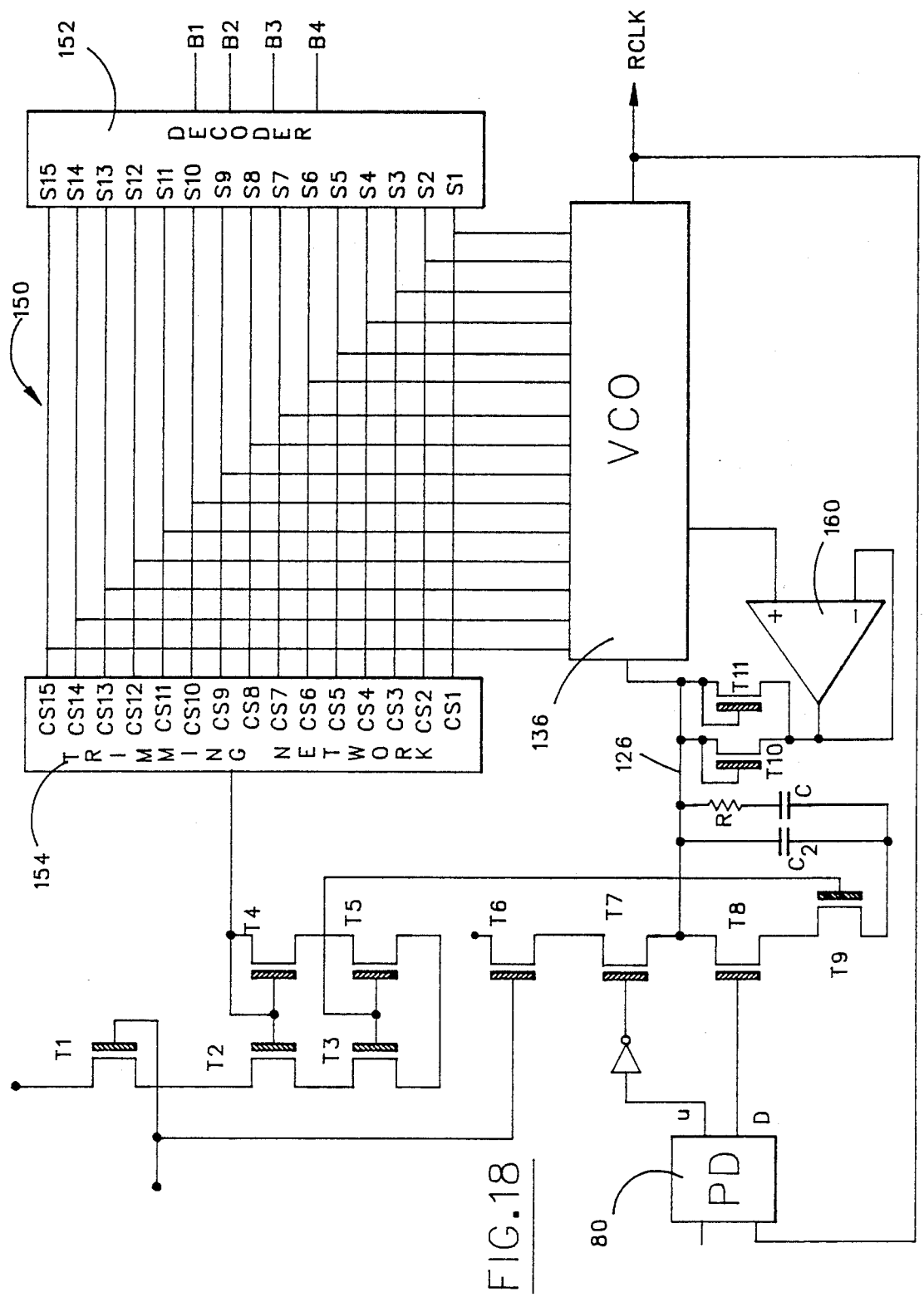
FIG. 18 illustrates a circuit implementation of the apparatus of FIG. 8 employing current trimming and digital control of the current controlled oscillator.
Figure 19:
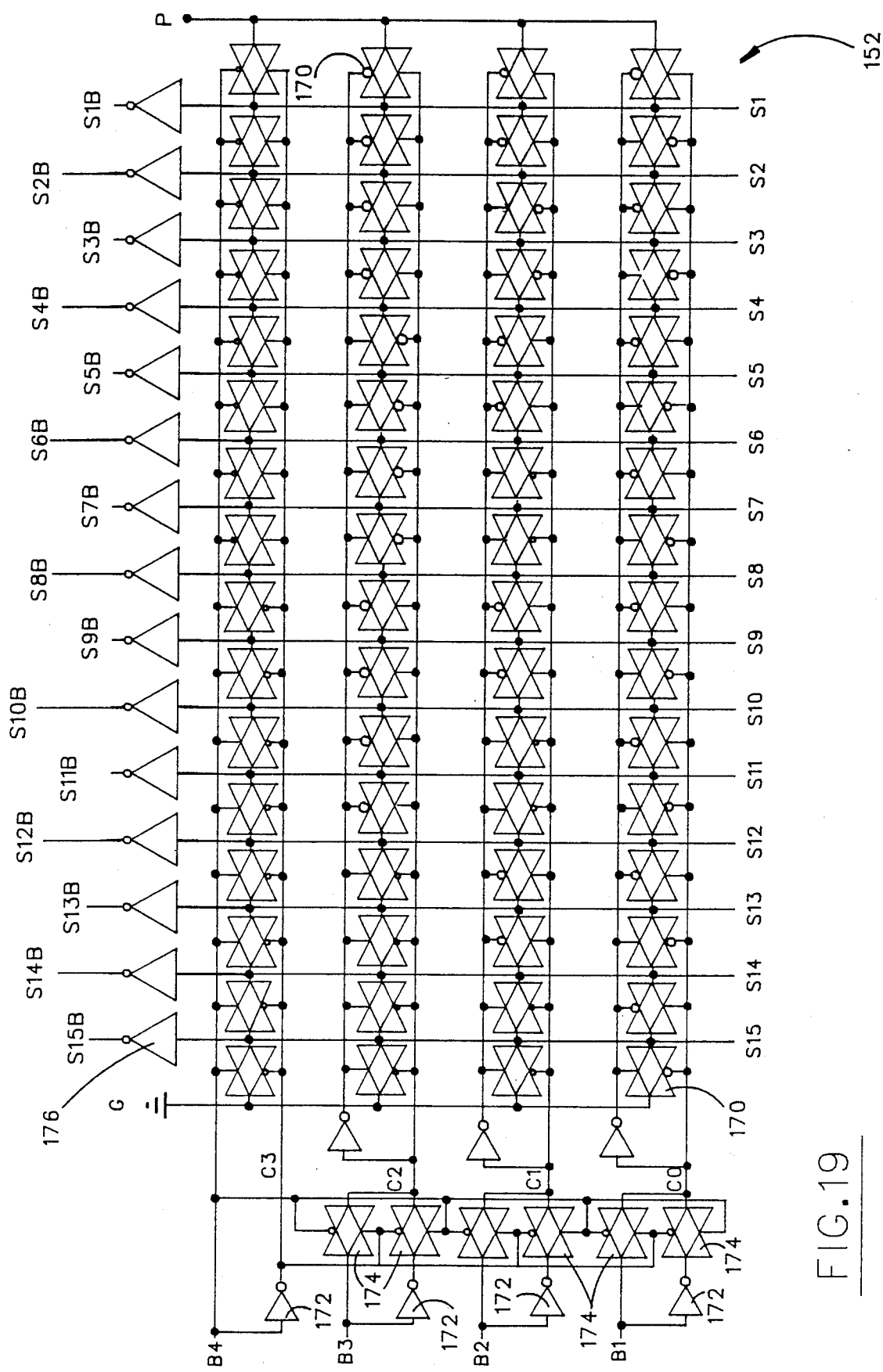
FIG. 19 illustrates a switch array for use in the decoder of FIG. 17.
Figure 20:
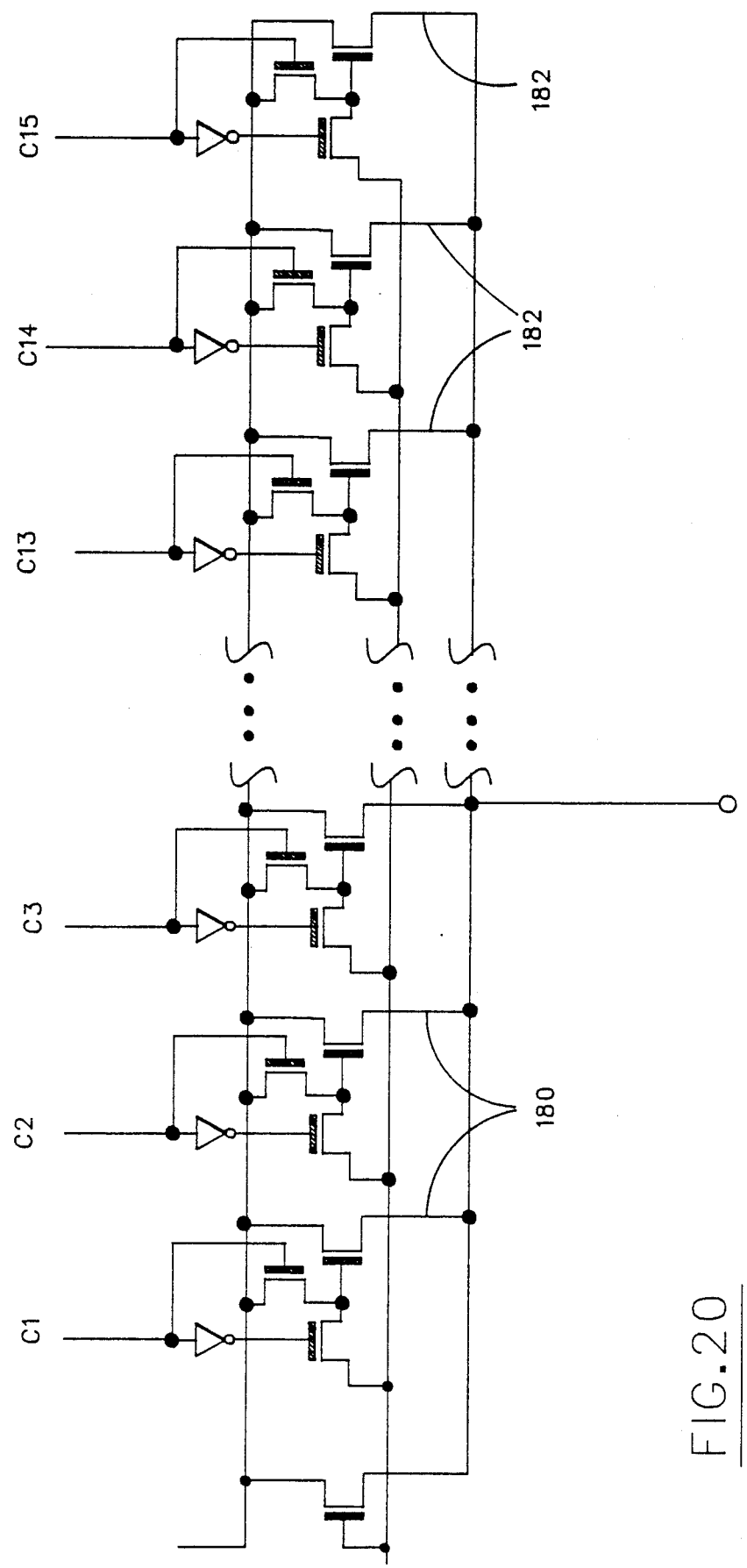
FIG. 20 illustrates a transistor matrix for implementing the current trimming network of FIG. 17.

The application of current trimming networks is illustrated in further detail in FIGS. 18-20. As shown in FIG. 18, the VCO 136 further comprises a fuse trimming network 150 which consists of 4 fuses of fused bus lines B1 to B4, connected to a fuse decoder 152. The decoder 152 accepts input from the four fuses and converts this input to a binary based signal across 15 output lines, here labeled as S1–S15. An exemplary decoder 152 is illustrated in FIG. 19 and corresponding output values for the lines S1–S15 are listed in Table I along with the fuse values.

TABLE I

| VCO Trimming Decoder | |
|---|---|
| B1 | 0 1 0 1 0 1 0 1 0 1 0 1 0 1 0 1 |
| B2 | 0 0 1 1 0 0 1 1 0 0 1 1 0 0 1 1 |
| B3 | 0 0 0 0 1 1 1 1 0 0 0 0 1 1 1 1 |
| B4 | 0 0 0 0 0 0 0 0 1 1 1 1 1 1 1 1 |
| C0 | 0 1 0 1 0 1 0 1 1 0 1 0 1 0 1 0 |
| C1 | 0 0 1 1 0 0 1 1 1 1 0 0 1 1 0 0 |
| C2 | 0 0 0 0 1 1 1 1 1 1 1 1 0 0 0 0 |
| C3 | 1 1 1 1 1 1 1 1 0 0 0 0 0 0 0 0 |
| S1 | 1 1 1 1 1 1 1 1 1 1 1 1 1 1 1 0 |
| S2 | 1 1 1 1 1 1 1 1 1 1 1 1 1 1 0 0 |
| S3 | 1 1 1 1 1 1 1 1 1 1 1 1 1 0 0 0 |
| S4 | 1 1 1 1 1 1 1 1 1 1 1 1 0 0 0 0 |
| S5 | 1 1 1 1 1 1 1 1 1 1 1 0 0 0 0 0 |
| S6 | 1 1 1 1 1 1 1 1 1 1 0 0 0 0 0 0 |
| S7 | 1 1 1 1 1 1 1 1 1 0 0 0 0 0 0 0 |
| S8 | 1 1 1 1 1 1 1 1 0 0 0 0 0 0 0 0 |
| S9 | 0 1 1 1 1 1 1 1 0 0 0 0 0 0 0 0 |
| S10 | 0 0 1 1 1 1 1 1 0 0 0 0 0 0 0 0 |
| S11 | 0 0 0 1 1 1 1 1 0 0 0 0 0 0 0 0 |
| S12 | 0 0 0 0 1 1 1 1 0 0 0 0 0 0 0 0 |
| S13 | 0 0 0 0 0 1 1 1 0 0 0 0 0 0 0 0 |
| S14 | 0 0 0 0 0 0 1 1 0 0 0 0 0 0 0 0 |
| S15 | 0 0 0 0 0 0 0 1 0 0 0 0 0 0 0 0 | where:
for B1–B4 0 = No fuse blown and 1 = fuse blown
for C3–C0 0 = Switch off and 1 = switch on
for S1–S15 0 = Low and 1 = High As shown in FIG. 19, the decoder 152 generally comprises an array of electronic or solid state switches 170 whose conductivity states are selectively altered according to the presence of signals on the fuse or bus lines B1–B4. These lines are used in conjunction with inverters 172, to switch the states of switches 174 and apply signals to the control lines C0–C3, which in turn to control the states of the switches 170. Those skilled in the art will readily understand the construction and operation of such a switch array.

The signals on S1 to S15 are input to a digitally controlled VCO 136 and establish a central operating frequency for the VCO. Those skilled in the art will readily understand the use of a VCO with digital input to set a frequency $f_o$.

There are a variety of components known to those skilled in the art which are useful in the construction of a digitally adjustable VCO. The current controlled oscillator of FIG. 17 is one circuit whose current can be controlled digitally, by using an array of control transistors and holding capacitors 140, 142, to achieve the desired results. Alternatively, a linear array of transistors, each of which is triggered by an output from the decoder, can be used to control the current delivered to a multivibrator, which determines its operating frequency.

When the circuit is formed on an IC, the output frequency of the VCO 136 or ICO 130 can be checked and then adjusted by blowing or opening the appropriate fuses B1–B4 to set the digital signals on S0–S15, and set the operating frequency of the ICO 130.

Circuit integration on silicon demands adjustments for the VCO 136 center frequency and the PLL 20 closed-loop bandwidth to compensate for the large component variations found in MOS and other fabrication processes. During mass production of circuits, measuring the center frequency for the ICO 130 can be accomplished relatively fast, but measuring the closed-loop bandwidth for the PLL 20 takes a relatively long time. Instead of calibrating them separately, using the new techniques of the present invention, one current trimming step completes both tasks.

As shown in FIG. 18, the digital outputs on the bus lines S1–S15 are also connected to a current trimming network 154 which uses these signals to activate current switches CS1–15. This can, but need not, be accomplished using the output lines S1B–S15B illustrated in FIG. 19. These lines employ isolation elements, such as, but not limited to, inverters 136 which isolate the VCO 176 and network 154 from each other. A preferred embodiment for these switches CS1–15 is illustrated in FIG. 20 and comprises an array of unitary Field Effect Transistor (FET) drivers 180 and 182 that are made the same width and length for the first six transistors (180) and then with a doubled width for the remaining nine (182). This means that the first six transistors 180 each pass one predetermined unit of current and the remainder transfer double that unit current. The digital input signals applied to the linear array of FETs act to switch in appropriate amounts of current passing through the matrix or network 154 in accordance with the digital signals.

As shown in FIG. 18, the current output by the trimming network 154 is transferred to a current controlled circuit that converts current to voltage using a reference voltage input and a series of FETs. Through the field effect transistors T1–9, the current source $I_p$ is applied along the control line 126. It can be seen that in this configuration the Up and DOWN output signals are used to activate or gate the FETs T7 and T8 on or off. When the UP signal is applied, the FET T7 is turned on and the current $I_p$ is applied to the control or input line 126. If the DOWN signal is turned on, the FET T8 is turned on and the current $I_p$ is passed to the transistor T9. Essentially the value of the voltage at line 126 is adjusted UP or DOWN. This in turn adjusts the input of the VCO 136 and the output frequency generated thereby. The transistors T10 and T11, and the OP-AMP 160 provide a voltage clamp to establish a threshold for the VCO 136.

In the embodiments of the present invention, two identical current producing DACs are used to trim the two key parameters. At the wafer test stage, on-chip polysilicon fuses are blown according to a measurement of the VCO central output frequency. The resulting digital code controls the VCO 136, or ICO 130, current DAC 132 to adjust the transfer curve between the VCO 136 input voltage and the charging current $I_p$. This in turn allows the ICO to oscillate at the desired frequency. The same digital code is applied to the current DAC 122 of the charge-pump loop filter 120 to adjust the charging current $I_c$ which, in turn, centers the PLL 20 closed-loop bandwidth to a predetermined frequency.

The input voltage of the two identical DACs in the VCO 136 and charge-pump loop filter 120 are equal by design and by definition. Due to the matching properties of monolithic circuits, the ratios between Ch (FIG. 17) and C remain substantially equal when they change during manufacture. Therefore, from the above relationships (Equations 1–4), using the same digital input code means that the ratio of the DAC output currents Ip and Ic also stays approximately constant on one chip, within the precision of component matching in the process. That is:

$$I_p/I_c = A$$

where A is a constant. Therefore, the PLL closed-loop bandwidth is derived as, $$f_n^2 = (0.2\ V_t/A(\pi)^2)\ (C_h/C)\ (f_0^2)$$

Trimming Ip by a certain percentage to let $f_o$ reach a desired value will also change Ic by the same percentage, consequently making $f_n$ come near the predetermined bandwidth. This is accomplished by the simultaneous control of two identical DACs used in the VCO and charge-pump line filter circuits.

Figure 21:
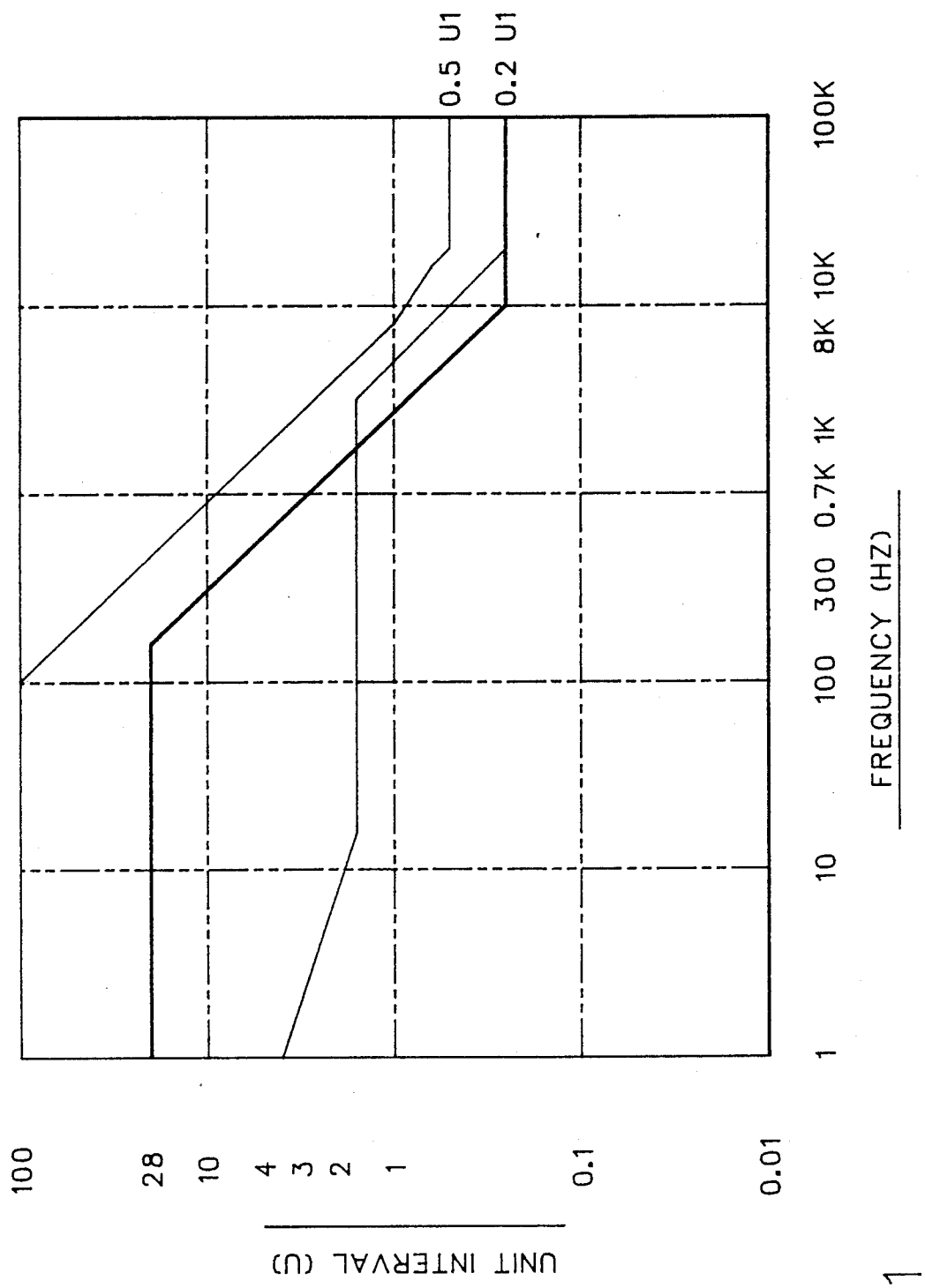
FIG. 21 illustrates a plot of jitter attenuation for the present invention.

An exemplary circuit for recovering data and a clock embedded in a data stream was constructed using a 3μ bulk CMOS process in an area of about 5500 square millimeters. The resulting jitter tolerance for this circuit is shown in FIG. 21 and exceeds current network designs and requirements. In FIG. 21, the line labeled 0.5 UI was the result for the exemplary circuit constructed and operated according to the principles of the invention. The line labeled 0.2 UI in FIG. 21 illustrates a current network jitter standard. The circuit fits well into CMOS integration as a functional block in VLSI systems.

What has been shown is a new method and apparatus for detecting the phase and frequency of received data and recovering the clock embedded in the data stream. The recovered clock is used with a new method of data recovery to recover data from a randomly varying data stream. The clock and data recovery are highly jitter tolerant exhibiting a 0.5 UI tolerance which is higher than previously obtained.

The foregoing description of preferred embodiments has been presented for purposes of illustration and description. It is not intended to be exhaustive nor to limit the invention to the precise forms disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What I claim as my invention is:

1. Method of recovering data from a digital data stream, comprising the steps of:
    generating a recovered clock signal at a frequency and phase substantially the same as said digital data;
    sampling said stream of data at a plurality of at least three predetermined, spaced apart, phase positions relative to said recovered clock signal to produce a plurality of data detection signals; and
    generating an output data signal comprising a logical combination of said data detection signals.

2. The method of claim 1 wherein said step of sampling further comprises the steps of:
    detecting the presence of "1" data values in said data stream which are displaced in phase from said recovered clock by a first predetermined amount;
    detecting the presence of "1" data values in said data stream which are displaced in phase from said recovered clock by a second predetermined amount; and
    detecting the presence of "1" data values in said data stream which are displaced in phase from said recovered clock by a third predetermined amount.

3. The method of claim 2 wherein said first, seCond, and third predetermined phase amounts are about 0, 90, and 180 degrees respectively.

4. The method of claim 3 wherein said first, second, and third predetermined phase amounts are about −90, 0, and 90 degrees respectively.

5. The method of claim 1 wherein said step of generating an output comprises the steps of applying each of said detected data signals to one input of a three-input OR gate and sampling an output of said gate at a rate determined by said recovered clock.

6. The method of claim 1 wherein said step of generating a recovered clock comprises the steps of:
generating a preselected frequency as a recovered clock using an adjustable frequency source of preset bandwidth;
detecting a difference in frequency and phase between said data in said data stream and said preselected frequency; and
adjusting phase and frequency output by said adjustable frequency source so as to substantially equal that of said data.

7. The method of claim 6 wherein said step of generating a preselected frequency comprises the step of generating a reference frequency from a current controlled oscillator having a digitally controlled central frequency.

8. The method of claim 7 further comprising the steps of:
activating a phase detector when data is detected during clock cycles of said recovered clock;
generating at least one control signal indicative of said detected difference in frequency and phase between said data and said recovered clock;
applying said control signal to a charge-pump loop filter; and
providing an input current to said current controlled oscillator from a charge-pump type loop filter.

9. The method of claim 8 wherein said step of activating comprises the step of:
detecting the presence of a leading edge for data values of "1" in said data stream when said recovered clock has a value of "1".
providing a reset input for said sequential-logic phase detector when no data is detected to provide no detection output; and
providing no reset signal when data is detected.

10. The method of claim 8 further comprising the steps of:
generating an UP signal in said phase detector in response to a detected difference of said recovered clock lagging said data in phase or frequency;
generating a DOWN signal in said phase detector in response to a detected difference of said recovered clock leading said data in phase or frequency;
providing an adjustable frequency output current controlled oscillator; and
adjusting an input current for said oscillator in response to said UP and Down signals by increasing or decreasing said current respectively.

11. The method of claim 10 further comprising the steps of:
providing a digitally adjustable current source for said charge-pump loop filter; and
trimming a current supplied by said adjustable current source to obtain a desired bandwidth for said charge-pump loop filter.

12. The method of claim 11 further comprising the steps of:
presetting a central operating frequency for said current controlled oscillator using a digital code; and
presetting a bandwidth for said loop filter using said same digital code to set a current trimming value.

13. The method of claim 12 wherein said steps of presetting comprise the steps of:
applying said digital code to a decoder to provide a control current for said current controlled oscillator; and
applying said digital code to a current trimming decoder to provide a control current for said charge-loop filter.

14. The method of claim 1 wherein said step of generating an output comprises the step of applying each of said data detection signals to a gating means for sampling said data detection signals to provide a logic high output when any of said detection signals are high and a logic low output when all of said detection signals are low.

15. An apparatus for recovering data from an input data stream signal, comprising:
means for generating a recovered clock signal at a frequency and phase substantially the same as said digital data; and
sampling means for detecting the presence of data at a plurality of at least three predetermined, spaced apart, phase positions relative to said recovered clock signal and for producing a plurality of data detection signals; and
combining means for receiving said plurality of data detections signals from said sampling means and for providing a recovered data output signal having a high value when at least one of said detection signals have a high data value and a low value when said detection signals are all low.

16. The apparatus of claim 12 wherein said sampling means comprises:
first sampling means for detecting the presence of a "1" data value at a first predetermined phase position relative to said recovered clock signal;
second sampling means for detecting the presence of a "1" data value at a second predetermined phase position relative to said recovered clock signal;
third sampling means for detecting the presence of a "1" data value at a third predetermined phase position relative to said recovered clock signal; and
combining means for receiving an output from each of said sampling means and for providing an output whenever any of said inputs has a data value of "1".

17. The apparatus of claim 16 wherein said first, second, and third predetermined phase positions are about 0, 90, and 180 degrees respectively.

18. The apparatus of claim 16 wherein said first, second, and third predetermined phase positions are about −90, 0, and 90 degrees respectively.

19. The apparatus of claim 16 wherein said first, second, and third sampling means comprise first, second, and third Flip-Flops respectively.

20. The apparatus of claim 19 wherein said first, second, and third Flip-Flops are connected to receive said recovered clock at a clock input, and further comprising:
first delay means connected in series with said second Flip-Flop for receiving said recovered clock and delaying it in phase a preselected amount; and second delay means connected in series with said second Flip-Flop for receiving said recovered clock and delaying it in phase a second preselected amount.

21. The apparatus of claim 20 wherein said first delay means comprises an inverter and said second delay means comprises phase delay means for delaying an arrival time of said recovered clock input on the order of 90 degrees of phase.

22. The apparatus of claim 16 wherein said combining means comprises a three-input NOR gate and further comprising an inverter in series therewith.

23. The apparatus of claim 16 wherein said combining means comprises a three-input OR gate.

24. The apparatus of claim 16 further comprising fourth sampling means connected in series with said combining means and having a reset input connected to receive said recovered clock.

25. The apparatus of claim 16 wherein said means for generating a recovered clock signal comprises a phase-locked loop comprising:
- a data activated sequential logic frequency/phase detector having a data input, a recovered clock input, an UP output, a DOWN output, and control means for deactivating said detector unless data is received during a recovered clock pulse;
- a charge pump loop filter connected in series with said frequency/phase detector having an UP input and a DOWN input connected to said Up and DOWN frequency/phase detector outputs respectively;
- a current controlled oscillator connected in series with said loop filter having a current input connected to an output of said loop filter and an output providing gan output recovered clock signal; and
- means for transferring said recovered clock signal to said frequency/phase detector clock input.

26. The apparatus of claim 25 wherein said data activating sequential logic phase/frequency detector comprises:
- a first input/output latch with two reset inputs;
- a second input/output latch with at least three reset inputs;
- at least a third input latch having an output connected to one of said three resets on the second input/output latch; and
- gating means connected to a set input on said third input latch having two input ports for receiving said data and a recovered clock signal and for resetting said second input/output latch for at least one predetermined clock period when both of said input ports are not detecting a "1" level.

27. The apparatus of claim 26 wherein:
said first input/output latch comprises a first two-input NAND gate with an output connected to one input of a three-input NAND gate which has an output connected to one input of said first two-input NAND gate;
said second input/output latch comprises a second two-input NAND gate with an output connected to one input of a first four-input NAND gate which has an output connected to one input of said second two-input NAND gate; and
said third input latch comprises a third two-input NAND gate with an output connected to one input of a fourth two-input NAND gate which has an output connected to one input of said third two-input NAND gate.

28. The apparatus of claim 27 further comprising:
- a third NAND gate latch having a set input connected to the output of said first two-input NAND gate, a reset input, and an output connected to an input of said three-input NAND gate;
- a fourth NAND gate latch having a set input connected to the output of said second two-input NAND gate, a reset input and an output connected to an input of said first four-input NAND gate; and
- a second four-input NAND gate connected to receive outputs from said first and second two-input NAND gates, and said third and fourth NAND latches, and connected on an output to a reset of said third and fourth NAND latches and to an input of said three-input NAND gate and said first four-input NAND gate.

29. The apparatus of claim 26 further comprising delay means connected in series between said gating means and said third input latch for delaying a time of arrival of a reset output for said gate means by a preselected period.

30. The apparatus of claim 26 wherein said data activating sequential-logic phase/frequency detector further comprises training means connected to said gating means and said third input latch deactivating said detector data input until a preselected capture range is reached.

31. The apparatus of claim 30 wherein said training means comprises a fifth two-input type NAND gate connected at one input to an output of said third input latch and an output connected to one of said three resets on the second input/output latch and having a second input connected to receive a deactivation control signal.

32. The apparatus of claim 30 wherein said training means comprises a fifth two-input type NAND gate connected at one input to an output of said third input latch and an output connected to one of said three resets on the second input/output latch and having a second input connected to receive a deactivation control signal.

33. The apparatus of claim 25 further comprising:
- a first two-input OR gate connected on one input to said UP output;
- a second two-input OR gate connected on one input to said DOWN output;
- a first inverter connected on an input to said DOWN output and on an output to a second input of said first 0R gate; and
- a second inverter connected on an input to said UP output and on an output to a second input of said second OR gate.

34. The apparatus of claim 25 wherein said charge-pump loop filter comprises:
at least one filter capacitor,
trimming means connected to said capacitor for establishing a base current for said charge-pump loop filter;
charging means connected to said capacitor for increasing a stored charge on said capacitor in response to an UP signal; and
discharging means connected to said capacitor for decreasing a stored charge on said capacitor in response to a DOWN signal.

35. The apparatus of claim 34 wherein said trimming means comprises a first digital trimming decoder configured to receive and translate a digital code into an analog current level.

36. The apparatus of claim 35 further comprising:

second digital decoder for translating a digital code into an analog current for controlling an oscillation frequency of said current controlled oscillator; and transfer means connected to both of said decoders for transferring a same digital code to both of said decoders.

37. The apparatus of claim 35 wherein said trimming decoder comprises:
- a digital decoding means for decoding a multi-bit digital signal into a plurality of digital control bits; and
- a plurality of FETs connected in parallel between a current source and a common output terminal each having a gate connected to receive separate ones of said digital control bits wherein different ones of said plurality of FETs are activated to deliver a predetermined current.

38. The apparatus of claim 37 further comprising a second plurality of FETs connected in parallel between a current source and a common output terminal each having a gate connected to receive separate ones of said digital control bits wherein different ones of said plurality of FETs are activated to deliver a predetermined current to said current controlled oscillator.

39. Apparatus for recovering an embedded clock in a data stream comprising:
- a data activated sequential logic frequency/phase detector having a data input, a recovered clock input, an UP output, a DOWN output, and control means for deactivating said detector unless data is received during a clock pulse;
- a charge pump loop filter connected in series with said frequency/phase detector having an UP input and a DOWN input connected to said Up and DOWN frequency/phase detector outputs respectively;
- a current controlled oscillator connected in series with said loop filter having a current input connected to an output of said loop filter and an output providing an output recovered clock signal; and
- means for transferring said recovered clock signal to said frequency/phase detector clock input.

40. The apparatus of claim 39 wherein said data activating sequential-logic phase/frequency detector further comprises training means for deactivating said detector data input until a preselected capture range is reached.

41. The apparatus of claim 39 wherein said charge-pump loop filter comprises:
- at least one filter capacitor;
- trimming means connected to said capacitor for establishing a base current fo rsaid charge-pump loop filter;
- charging means connected to said capacitor for increasing a stored charge on said capacitor in response to an UP signal; and
- discharging means connected to said capacitor for decreasing a stored charge on said capacitor in response to a DOWN signal.

42. The apparatus of claim 41 wherein said trimming means comprises a first digital trimming decoder configured to translate a digital code into an analog current level which is output to said capacitor.

43. The apparatus of claim 42 further comprising:
- a second digital decoder connected to said current controlled oscillator and configured to translate a digital code into an analog current for controlling an oscillation frequency of said current controlled oscillator; and
- transfer means connected to both of said decoders for inputting a same digital code to both of said decoders.

44. The apparatus of claim 42 wherein said trimming decoder comprises a plurality of field effect transistors connected in parallel between a current source and a common output terminal having gates connected to receive separate portions of said digital code wherein selected ones of said plurality of field effect transistors are activated to deliver a predetermined current from said decoder.

45. A data activated sequential logic phase/frequency detector useful in recovering an embedded clock in a data stream, comprising:
- a first input/output latch with three reset inputs, a data input, and an UP signal output;
- a second input/output latch with least four reset inputs, a recovered clock signal input, and a DOWN signal output;
- at least a third input latch having an output connected to one of the three resets on the second input/output latch; and
- gating means connected to a set input on said third input latch having two input ports for receiving said data and a recovered clock signal and for resetting said second input/output latch for at least one predetermined clock period when both of said input ports are not detecting a high logic level simultaneously.

46. The apparatus of claim 45 wherein:
said first input/output latch comprises a first two-input NAND gate with an output connected to one input of a three-input NAND gate which has an output connected to one input of said first two-input NAND gate;
said second input/output latch comprises a second two-input NAND gate with an output connected to one input of a first four-input NAND gate which has an output connected to one input of said second two-input NAND gate; and
said third input latch comprises a third two-input NAND gate with an output connected to one input of a fourth two-input NAND gate which has an output connected to one input of said third two-input NAND gate.

47. The apparatus of claim 45 further comprising delay means connected in series between said gating means and said third input latch for delaying a time of arrival of a reset output for said gate means by a preselected period.

48. The apparatus of claim 45 wherein said data activating sequential-logic phase/frequency detector further comprises training means connected to said gating means and said third input latch for deactivating said detector data input until a preselected capture range is reached.

49. The apparatus of claim 45 further comprising:
- a first two-input OR gate connected on one input to said UP output;
- a second two-input OR gate connected on one input to said DOWN output;
- a first inverter connected on an input to said DOWN output and on an output to a second input of said first OR gate; and a second inverter connected on an input to said UP output and on an output to a second input of said second OR gate.

50. The apparatus of claim 45 further comprising:

a third NAND gate latch having a set input connected to the output of said first two-input NAND gate, a reset input, and an output connected to an input of said three-input NAND gate; p1 a fourth NAND gate latch having a set input connected to the output of said second two-input NAND gate, a reset input and an output connected to an input of said first four-input NAND gate; and a second four-input NAND gate connected to receive outputs from said first and second two-input NAND gates, and said third and fourth NAND latches, and connected on an output to a reset of said third and fourth NAND latches and to an input of said three-input NAND gate and said first four-input NAND gate.

51. A method for extracting a clock from a data stream, comprising the steps of:

providing a phase-locked loop comprising:

phase/frequency detection means for determining a difference in phase and frequency between two input signals and for generating at least one control signal indicative of said detected differences;

a charge-pump loop filter connected in series with said phase detector having an adjustable bandwidth and current output;

a current controlled oscillator having an adjustable central frequency connected to receive said variable current output from said loop filter and having an output connected to one input of said phase detection means;

providing a digitally controllable current source for said current controlled oscillator;

providing a digitally adjustable current source for said loop filter;

preselecting a desired bandwidth for said loop filter and a starting central operating frequency as a recovered clock signal for said current controlled oscillator by applying a digital code to both of said adjustable current sources;

detecting a difference in frequency and phase between said data stream and said recovered clock signal; and adjusting said charge-pump loop filter output current in response to said control signal; and adjusting said current controlled oscillator phase and frequency output in response to said loop filter output so as to substantially equal that of said data.

52. The method of claim 51 wherein said step of preselecting further comprises the steps of:

applying said digital code to a digital decoder; and translating said digital code into a plurality of digital control bits.

53. The method of claim 52 further comprising the steps of:

applying said digital control bits to a current trimming decoder;

applying said digital control bits to a current driver decoder;

translating said control bits in said current driver decoder into an analog control current for said current controlled oscillator; and translating said digital control bits in said current trimming decoder into an analog control current for said charge-pump loop filter.

* * * * *